(12) United States Patent
Peña-Mora et al.

(10) Patent No.: US 7,415,393 B1
(45) Date of Patent: Aug. 19, 2008

(54) RELIABILITY BUFFERING TECHNIQUE APPLIED TO A PROJECT PLANNING MODEL

(75) Inventors: Feniosky Peña-Mora, Champaign, IL (US); Moonseo Park, Seoul (KR); SangHyun Lee, Somerville, MA (US); Michael Li, Palos Verdes Estates, CA (US); Margaret Fulenwider, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1164 days.

(21) Appl. No.: 10/068,087

(22) Filed: Feb. 6, 2002

Related U.S. Application Data

(60) Provisional application No. 60/298,459, filed on Jun. 14, 2001.

(51) Int. Cl.
  *G06F 17/50* (2006.01)
  *G05B 13/02* (2006.01)
  *G06F 19/00* (2006.01)
  *G06F 9/46* (2006.01)
(52) U.S. Cl. .................. 703/1; 700/46; 700/99; 700/100; 700/101; 700/102; 705/8; 705/9
(58) Field of Classification Search .......... 703/1; 707/103 R; 705/8–9; 700/99–108, 46
See application file for complete search history.

(56) References Cited

U.S. PATENT DOCUMENTS

| | | | |
|---|---|---|---|
| 4,368,509 A | 1/1983 | Li | |
| 4,472,770 A | 9/1984 | Li | |
| 4,710,864 A | 12/1987 | Li | |
| 4,797,839 A | 1/1989 | Powell | |
| 4,852,001 A | 7/1989 | Tsushima | |
| 4,910,660 A | 3/1990 | Li | |
| 4,937,743 A | 6/1990 | Rassman et al. | |

(Continued)

FOREIGN PATENT DOCUMENTS

WO    WO0101206 A2    1/2001

OTHER PUBLICATIONS

F. Pena-Mora et al., "Dynamic Planning and Control Methodology for Design/Build Fast-Track Construction Projects" Jan./Feb. 2001 Journal of Construction Engineering Management p. 1-17.*

(Continued)

*Primary Examiner*—Albert DeCady
*Assistant Examiner*—Thomas H Stevens
(74) *Attorney, Agent, or Firm*—Daly, Crowley, Mofford & Durkee, LLP

(57) ABSTRACT

A reliability buffering technique applies a reliability time buffer to a project planning model having activities. The reliability time buffer is placed before an associated downstream activity to provide a buffered downstream activity. The reliability buffer is provided having a time duration value and an activity time precedence relationship, including a lead or lag value, with at least one upstream activity. The time duration value and the activity time precedence relationship are generated so as to reduce the overall schedule delay resulting from possible time delays that occur in the one or more upstream activities and to increase the overall project schedule advance from possible schedule advances in the one or more upstream activities.

18 Claims, 14 Drawing Sheets

U.S. PATENT DOCUMENTS

| | | | | |
|---|---|---|---|---|
| 5,016,170 | A | * | 5/1991 | Pollalis et al. ................. 705/7 |
| 5,021,976 | A | | 6/1991 | Wexelblat et al. |
| 5,053,970 | A | | 10/1991 | Kurihara et al. |
| 5,057,992 | A | | 10/1991 | Traiger |
| 5,111,404 | A | | 5/1992 | Kotani |
| 5,128,860 | A | | 7/1992 | Chapman |
| 5,148,365 | A | | 9/1992 | Dembo |
| 5,173,869 | A | | 12/1992 | Sakamoto et al. |
| 5,229,948 | A | | 7/1993 | Wei et al. |
| 5,303,170 | A | | 4/1994 | Valko |
| 5,321,620 | A | | 6/1994 | Tanaka et al. |
| 5,369,570 | A | * | 11/1994 | Parad ............................ 705/8 |
| 5,381,332 | A | | 1/1995 | Wood |
| 5,414,843 | A | | 5/1995 | Nakamura et al. |
| 5,524,077 | A | | 6/1996 | Faaland et al. |
| 5,537,524 | A | | 7/1996 | Aprile |
| 5,623,404 | A | | 4/1997 | Collins et al. |
| 5,671,360 | A | | 9/1997 | Hambrick et al. |
| 5,737,728 | A | | 4/1998 | Sisley et al. |
| 5,748,907 | A | | 5/1998 | Crane |
| 5,761,674 | A | | 6/1998 | Ito |
| 5,764,543 | A | | 6/1998 | Kennedy |
| 5,765,139 | A | | 6/1998 | Bondy |
| 5,767,848 | A | | 6/1998 | Matsuzaki et al. |
| 5,826,252 | A | | 10/1998 | Wolters et al. |
| 5,893,074 | A | | 4/1999 | Hughes et al. |
| 5,907,490 | A | | 5/1999 | Oliver |
| 5,918,219 | A | | 6/1999 | Isherwood |
| 5,930,156 | A | * | 7/1999 | Kennedy ....................... 703/6 |
| 6,047,260 | A | | 4/2000 | Levinson |
| 6,101,481 | A | | 8/2000 | Miller |
| 6,122,633 | A | * | 9/2000 | Leymann et al. .............. 707/10 |
| 6,289,340 | B1 | * | 9/2001 | Puram et al. ................... 707/5 |
| 6,415,196 | B1 | | 7/2002 | Crampton et al. |
| 6,931,365 | B1 | | 8/2005 | Mehta et al. |

OTHER PUBLICATIONS

F. Pena-Mora et al., "Component-based Software Development for Integrated Construction Management Software Applications" Aug. 2000, Artificial Intelligence for Engineering Design p. 173-187.*

Koskela-L., "Management of Production in Construction: A Theoretical View"; Jul. 1999 University of California Berkeley p. 214-252.*

Li, Michael In-Chiang, "A Robust Planning and Control Methodology for Design-Build Fast-Track Civil Engineering and Architectural Projects", Feb. 1999, pp. 1-107.

Park, Moonseo, "Robust Control of Cost Impact on Fast-Tracking Building Construction Projects," Jun. 1999, pp. 2-75.

Park, M. and Peña-Mora, F., "Dynamic Planning and Control of Construction Projects," ASCE/ICCCBE 2000 Conference 1 Computing in Civil and Building Engineering, Stanford, CA, ASCE Press, Redmond, VA Aug. 2000, pp. 414-423.

Park, Moonseo et al., "Dynamic Planning and Control of Construction Projects". Aug. 15, 2000. pp. 424-467.

Peña-Mora, Feniosky and Park, Moonseo, "Dynamic Planning and Control Methodology for Large-Scale Infrastructure Projects," Mar. 2001, pp. 301-347.

Lee, SanHyun, "Research Progress Report The Dynamic Planning and Control Methodology in Global Construction Management," Research Progress Report, MIT, Mar. 23, 2001, pp. 1-37.

Fulenwider, Margaret, "Dynamic Planning and Control for Large-Scale Infrastructure Projects: Route 3N as a Case Study," Research Progress Report, MIT, Mar. 23, 2001, 100 pgs.

Park, Moonseo, "Dynamic Planning and Contol Methodology for Large-Scale Concurrent Construction Projects," Apr. 3, 2001, pp. 348-372.

Park, M. and Peña-Mora, F., Reliability Buffering for Concurrent Construction, submitted for review to the ASCE Journal of Construction Engineering and Management, Jun. 2001, pp. 284-300.

Peña-Mora, Feniosky, and Park, Moonseo, "Dynamic Planning for Fast-Tracking Building Construction Projects," ASCE Journal of Construction Engineering and Management, vol. 127, No. 6, Dec. 2001, pp. 1-12.

Peña-Mora, Feniosky and Dwivedi, G., "A Multiple Device Collaborative and Real Time Analysis System for Project Management in Civil Engineering," ASCE Journal of Computing in Civil Engineering. vol. 16, No. 1, Jan. 2002, pp. 373-401.

Hadavi et al.; "ReDS—A Dynamic Planning, Scheduling, and Control System for Manufacturing;" 1990 Journal of Manufacturing Systems; vol. 9, No. 4; pp. 331-344.

Hadavi et al.; "ReDSS—A Dynamic Planning, Scheduling, and Control System for Manufacturing;" 1999 Journal of Manufacturing Systems; vol. 9, No. 4; pp. 331-344.

Allweyer et al.; "Model-Based Re-Engineering in the European Construction Industry;" Construction Informatics Digital Library; http://ifc.scix.net/paper w78-1996-21.content; 11 pages.

Pena-Mora et al.; "Dynamic Planning and Control Methodology for Design/Build Fast-Track Construction Projects;" ASCE Journal of Construction Engineering and Management; Jan./Feb. 2001; 18 pages.

* cited by examiner

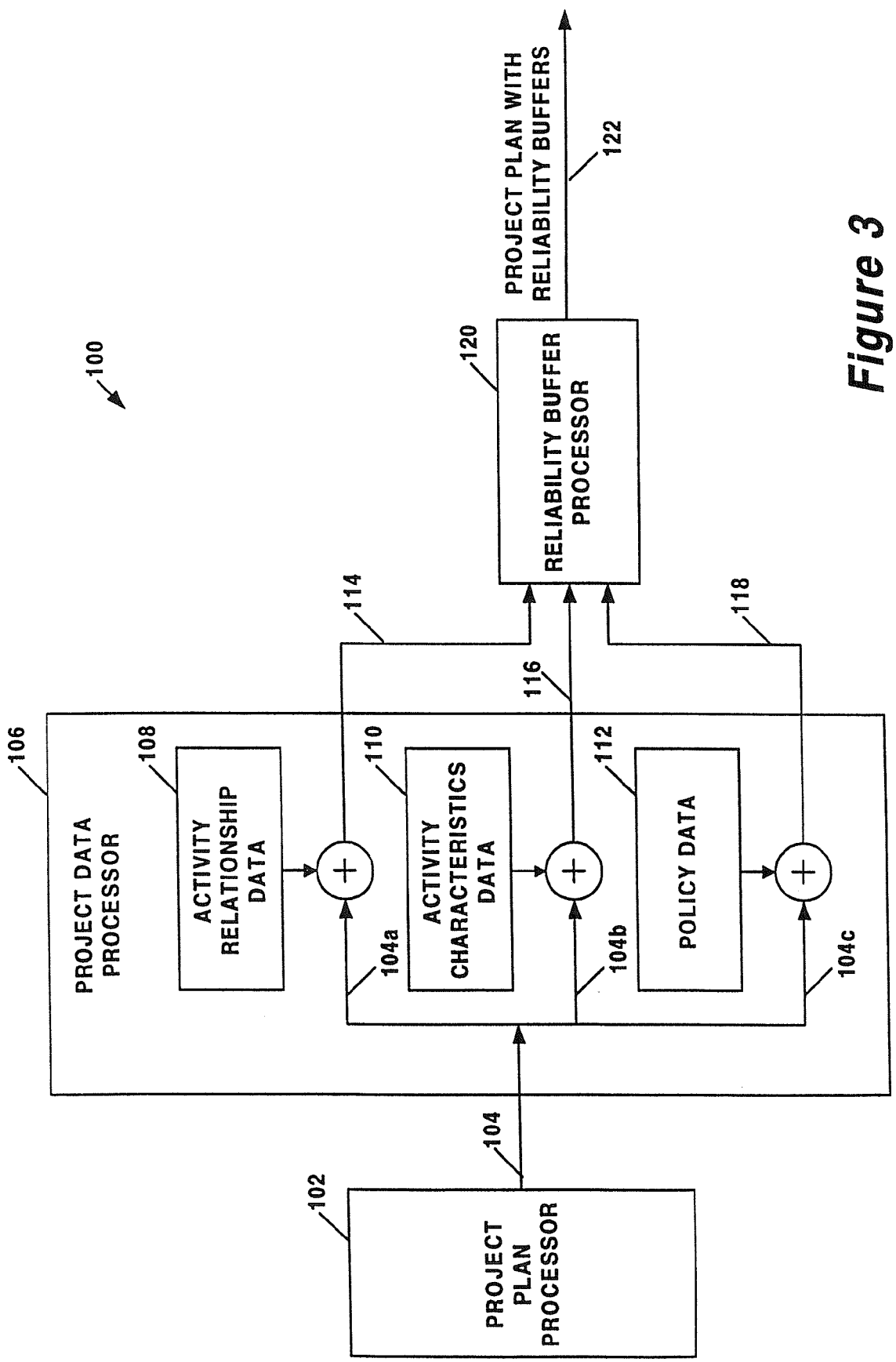

RELIABILITY BUFFERING TECHNIQUE APPLIED TO A PROJECT PLANNING MODEL

CROSS REFERENCE TO RELATED APPLICATIONS

This application claims the benefit of U.S. Provisional Application No. 60/298,459, filed on Jun. 14, 2001 which application is hereby incorporated herein by reference in its entirety.

STATEMENT REGARDING FEDERALLY SPONSORED RESEARCH

This invention was made with government support under Contract No. 9875557 awarded by the National Science Foundation, Civil Mechanical Systems Division. The government has certain rights in the invention.

FIELD OF THE INVENTION

This invention relates generally to project management and more particularly to a reliability buffering technique applied to a project planning model.

BACKGROUND OF THE INVENTION

As is known in the art, a model is a representation or approximation of a real world process, device or concept. A model can be implemented in computer code for execution on a processor in order to allow a user to rapidly vary model parameters and to understand the impact on the process, device or concept of varying such parameters.

A project planning model is a model that can be used to plan a project (e.g. a construction project). Some well-known project planning models include a dependency structure matrix (DSM), a critical path method (CPM), a precedence diagram method (PDM), a concurrent engineering technique, a critical chain technique, an overlapping framework technique, various system dynamics techniques, a simulation language for alternative modeling technique (SLAM), a graphical evaluation and review technique (GERT), a queue graphical evaluation and review technique (Q-GERT), and a program evaluation and review technique (PERT). Such conventional project planning models are used to plan and control projects.

As mentioned above, such models can be implemented in as computer code for execution on a processor to provide computer implemented project management tools which can be used to aid in the planning and management of projects such as construction projects and the like. In this manner, computer tools which apply the principles of particular project planning models are provided. Such tools provide a project manager with the ability to generate an initial project plan and to update and modify the project plan thereafter.

As is also known, a so-called "network based" project planning model provides a model of a project plan having activities and time relationship linkages between the activities. A database underlying the conventional project planning model will be referred to herein as conventional project plan data, having conventional project plan data elements. Of the above-mentioned techniques, CPM, PDM, PERT, and GERT will be recognized to be the most common network based project planning models.

Conventional project plan data elements of PDM, for example, include a list of activities, an activity duration value for each activity, and time precedence relationships between the activities. A time precedence relationship describes a relationship between two activities. For example if a first activity must finish before a second activity can start, the first and second activities are said to be in a "finish to start" time precedence relationship. Time precedence relationships include finish to start (FS), finish to finish (FF), start to finish (SF), and start to start (SS) relationships. The time precedence relationships can also include lead or lag times. For example, when two activities are related in an FS time precedence relationship, a downstream activity is planned to start at the completion of an upstream activity to which it is related. For another example, when two activities are time related in an FS relationship with lead, a downstream activity can begin a lead period before the completion of an upstream activity to which it is related. This is contrasted with an FS relationship with lag for which the downstream activity is delayed to start with a lag delay after the completion of an upstream activity to which it is related.

Contingency time buffers, also called contingency buffers, are conventionally applied to the end of one or more activities in the project plan to absorb the effect of time delay, or slippage, of individual activities. Contingency buffers attempt to ensure that the total time duration of the project is preserved even when the durations of individual activities expand, either from expected or from unexpected changes.

To the conventional project plan data elements above, PERT and GERT add various other conventional project plan data elements. PERT, for example, includes probability values associated with the duration value of each activity. The probability value assigns a probability to the likelihood that an activity will be completed within its scheduled duration. PERT also adds a path probability value to each time precedence relationship. The path probability value corresponds to the likelihood that a time precedence relationship will be achieved as planned. GERT adds probabilistic time precedence relationship branching.

Conventional project planning models that utilize contingency buffers are generally inefficient in protecting the project schedule performance. Once added to the duration of an activity, a contingency buffer can be considered by those workers performing the activity to be part of the original time schedule of the activity without distinction. When workers realize that they have extra time to complete a task, their work tends to expand to fill the perceived extra time, creating an indeterminate duration. As a result, the contingency buffer generally does not function effectively to protect the initially planned overall schedule duration.

Furthermore, when contingency buffers are applied to a project plan at a "merging point," no benefit is gained to the overall project schedule from an activity that finishes early at the merging point. A merging point will be understood to be a place in a project plan at which a first and a second activity both have a time precedence relationship with a third activity.

Therefore, it would be desirable to provide a project planning method as part of a project planning model that has the ability to absorb time slippages and project changes yet which does not tend to expand a project schedule when such slippages and changes occur. It would be further desirable to provide a project planning method with which the overall project schedule benefits from the early completion of activities at a merging point.

SUMMARY OF THE INVENTION

In accordance with the present invention, a reliability buffering method is associated with a project planning model, which includes project plan data and a plurality of activities. From among the plurality of activities, the reliability buffering method selects upstream and downstream activities for study. Activity relationship data and activity characteristics data associated with the upstream and downstream activities are added to the project plan data. Given the project plan data, a reliability buffer duration value is determined in a way that a project schedule delay due to possible schedule delays that can occur in the selected upstream activities is reduced and a project schedule advance due to possible schedule advances that can occur in the selected upstream activities is increased. Then, a reliability buffer having the reliability buffer duration value is placed in front of the selected downstream activity. If necessary, a new time precedence relationship between the upstream activity and the downstream activity is generated. An initially generated reliability buffer project plan can be updated when new project plan data is provided to the project planning model.

In accordance with a further aspect of the present invention, a reliability buffering method includes selecting a downstream activity and adding, to the project plan data, activity relationship data associated with the downstream activity and with at least one upstream activity. The method further includes adding activity characteristics data associated with the downstream activity to the project plan data. The method still further includes placing the reliability buffer in a buffer time precedence relationship with the downstream activity to provide a buffered downstream activity. A reliability buffer duration value is generated corresponding to the project plan data. The method also includes generating an activity time precedence relationship, optionally including a lead or lag value, between the buffered downstream activity and the at least one upstream activity. An initial reliability buffer project plan is thus generated. The initially generated reliability buffer project plan can be updated when new project plan data is provided to the project planning model.

With this particular arrangement, the reliability buffering method, when applied to a project planning model, has the ability to absorb time slippages and project changes yet does not tend to expand a project schedule when such slippages and changes occur. The reliability buffering method also provides schedule benefits from the early completion of activities (e.g. downstream activities can be completed ahead of schedule if upstream activities are completed ahead of schedule). Furthermore, the reliability buffer method of the present invention reduces the impression to workers that additional time is available to complete an activity.

In accordance with a still further aspect of the present invention, a project management system includes a project data processor to provide project plan data, and a reliability buffer processor adapted to receive that project plan data and to generate the reliability buffer project plan having the reliability buffers.

With this particular arrangement a project management system is provided that can generate a project plan with embedded reliability buffers. The project plan with embedded reliability buffers provides a project schedule having advantages over a project schedule having conventional contingency buffers. In one embodiment, the project data processor can optionally receive conventional project plan data provided by a project plan processor.

BRIEF DESCRIPTION OF THE DRAWINGS

The foregoing features of the invention, as well as the invention itself may be more fully understood from the following detailed description of the drawings, in which:

FIG. 3 is a block diagram of a project planning system that includes a reliability buffer processor;

DETAILED DESCRIPTION OF THE DRAWINGS

Figure 1:
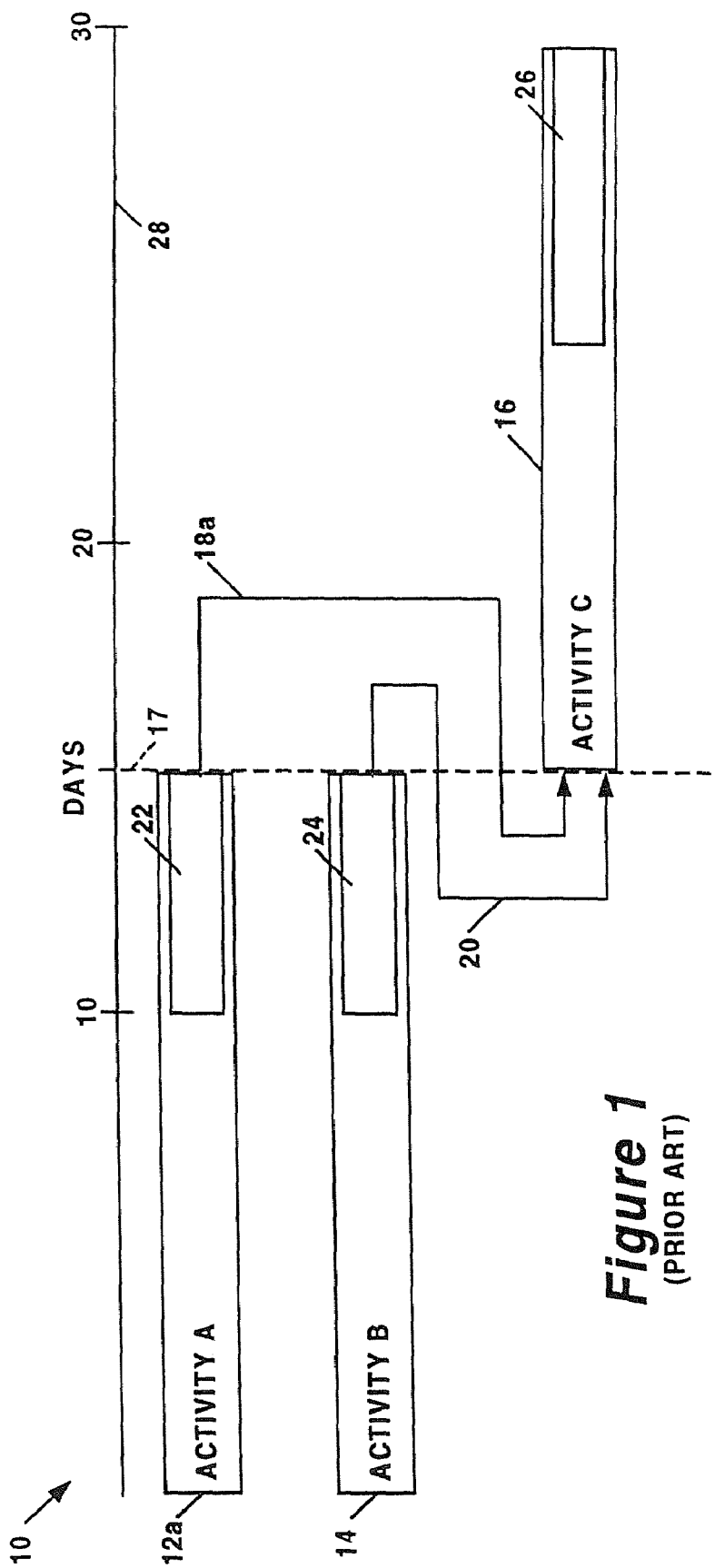
FIG. 1 is a chart of prior art project plan which includes contingency buffers applied at a merging point in the project plan.

Before describing the application of reliability buffering to a project planning model, some introductory concepts and terminology are explained. In general, the term "upstream activity" will be used to describe one activity that begins at an earlier time than another activity. The term "downstream activity" will be used to describe one activity that begins at a later time than another activity. Thus, considering only two activities of a project plan that do not occur at the same time, one is necessarily an upstream activity and the other is a downstream activity. The terms upstream and downstream correspond only to the relative starting times of the activities.

Conventional project planning models have a variety of so-called "time precedence relationships," also called relationships and precedence relationships between activities. For example, time precedence relationships can be finish to start (FS), start to start (SS), start to finish (SF), and finish to finish (FF). An FS time precedence relationship is one for which a downstream activity is planned to start immediately upon the finish of an upstream activity. An FF time precedence relationship is one for which a two activities are planned to finish at the same time. An SF time precedence relationship is one for which a downstream activity is planned to start immediately upon the finish of an upstream activity. An SS time precedence relationship is one for which two activities are planned to start at the same time. The FS and the SF time precedence relationships are similarly described in terms of upstream and downstream activities. It will be recognized that their difference arises only in the physical sequence by which the two activities are represented on a chart.

These time precedence relationships include and can be altered with lead and lag times. A lead time corresponds to an advancement of an activity that is linked to another activity in one of the above relationships, by an amount that is equal to the lead time. A lag time corresponds to a retardation of an activity that is linked to another activity, by an amount that is equal to the lag time.

The term "merging point" will be used to describe a relationship between activities in a project plan for which two or more activities have a time precedence relationship with a third activity. For example, a merging point exists when two activities have an FS time precedence relationship with a third activity.

As described above, a project plan database underlying a project planning model will be referred to herein as "project plan data", having "project plan data elements". The term "activity characteristics data" will be used to describe project plan data elements that corresponds to an individual activity. For example an activity name corresponds to only one activity. The term "activity relationships data" will be used to describe project plan data elements that corresponds to two related activities. For example, time precedence relationships correspond to a time linkage between two activities. The term "policy data" will be used to describe project plan data elements that corresponds to one or more activities that can be related or unrelated. For example, a policy of the use of overtime labor can globally correspond to groups of unrelated activities. Activity characteristics data, activity relationship data, and policy data can be of a conventional type. However, they can also be provided in accordance with certain aspects of this invention.

Referring to FIG. 1, an illustrative example is shown of a prior art project plan chart 10 which includes time bars 12a, 14 and 16 for three activities A, B, C having an FS relationship at a merging point, designated by reference numeral 17. The project plan chart 10 corresponds to an initially planned schedule. Activities A, B, C have durations represented by the length of the associated time bars 12a, 14, 16. Activity A and activity B each have an FS relationship 18a, 20 with activity C. Conventional contingency buffers, initially incorporated into the schedule, are indicated by time bars 22, 24, 26. A time scale 28 represents illustrative times associated with the various time bars.

In general, a conventional contingency buffer (e.g. buffers 22, 24, 26) provides a time buffer associated with some or all of the activities of a project. Each contingency buffer is typically placed at the end of an associated task or activity, thereby extending the planned duration of an activity to allow for time slippage of the activity or changes to the activity. Use of contingency buffers allows for schedule slip beyond the anticipated duration of individual activities. By placing a contingency buffer on an upstream activity, a downstream activity depending upon the upstream activity can begin at its originally scheduled time even though the elapsed time required to complete the upstream activity may have been longer than originally anticipated. The extra time taken by the upstream activity is absorbed by its associated contingency buffer. This assumes of course that the downstream activity is scheduled to start after the end of the contingency buffer.

As shown in FIG. 1, the conventional contingency buffers 22, 24, 26 are applied to the ends of the time bars 12a, 14, 16 associated with activities A, B, C. Though the activities A, B were originally anticipated (but not planned) to each be completed in 10 days, an additional contingency buffer 22, 24 respectively of 5 days duration has been added to each activity as initially planned. Thus, activity A and activity B are initially planned to occur with a 15 day duration. If the contingency time buffers 22, 24, 26 are actually consumed in performing activities A, B, and C, the total duration of these activities is 30 days as indicated.

Figure 1A:
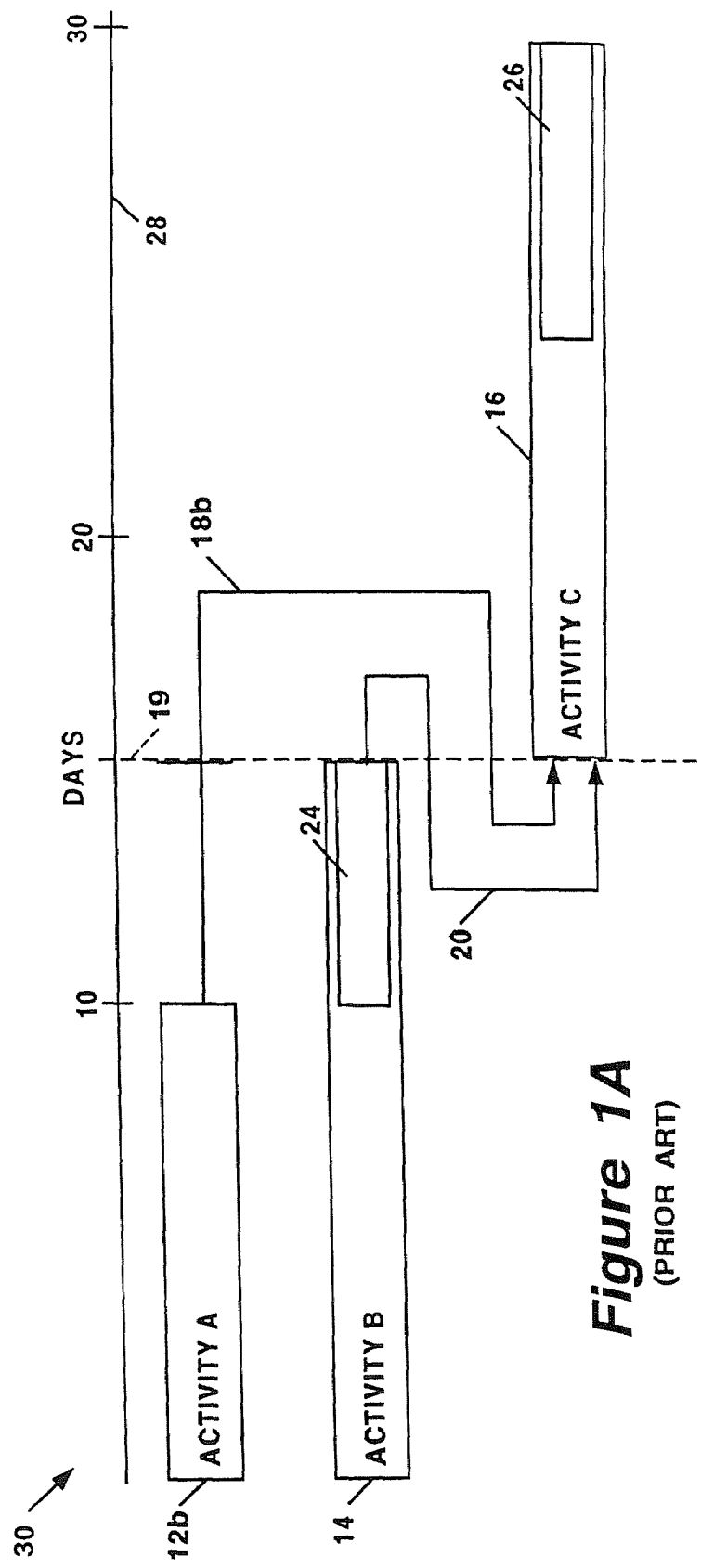
FIG. 1A is another chart of a prior art project plan which includes contingency buffers applied at a merging point.

Referring now to FIG. 1A, in which like elements of FIG. 1 are provided having like reference designations, another illustrative example is shown of a project plan chart 30 for which the three activities A, B, C have an FS relationship at a merging point 19. The project plan chart 30 corresponds to an updated schedule, that has been updated from the schedule of FIG. 1 at an update time. Updated schedules will be further discussed below. If the contingency buffer 22 (FIG. 1) that was initially associated with activity A is not actually consumed, but rather activity A is actually finished in 10 days as was anticipated, the total duration of the three activities A, B, C remains 30 days. Thus, using a conventional project planning approach, no project schedule benefit has been gained by the finish of activity A in 10 days time. Note also that the FS time precedence relationship 18a shown in FIG. 1 has become an FS time precedence relationship 18b with a lag of 5 days, corresponding to the time duration between the finish of activity A in FIG. 1A and the start of activity C in FIG. 1A.

As shown in FIG. 1A, activity C cannot start until activity B is completed, even though activity A did not consume its associated 5 day contingency buffer time. As a result, the start time of activity C is determined by the actual duration of activity C, and a schedule advance achieved in activity A does not add any benefit to the overall project schedule. Furthermore, delays (not shown) in the completion of activity B will cause a time delay in the start of activity C. For example, assuming that it took 20 days to finish activity B, the 5 day delay in activity B delays the start of activity C for 5 days. As a result, the total duration of the three activities A, B, C is extended to 35 days. Thus, contingency buffers are often inefficient at the merging points of a project plan.

Another drawback of the contingency buffer, as mentioned above, is that once added to the duration of an activity, a contingency buffer can be considered by those workers performing the activity to be part of the original schedule of the activity without distinction. When workers realize that they have extra time to complete a task, their work tends to expand to fill the perceived extra time. As a result, the contingency buffer generally does not function well to protect the original overall schedule duration.

Figure 2:
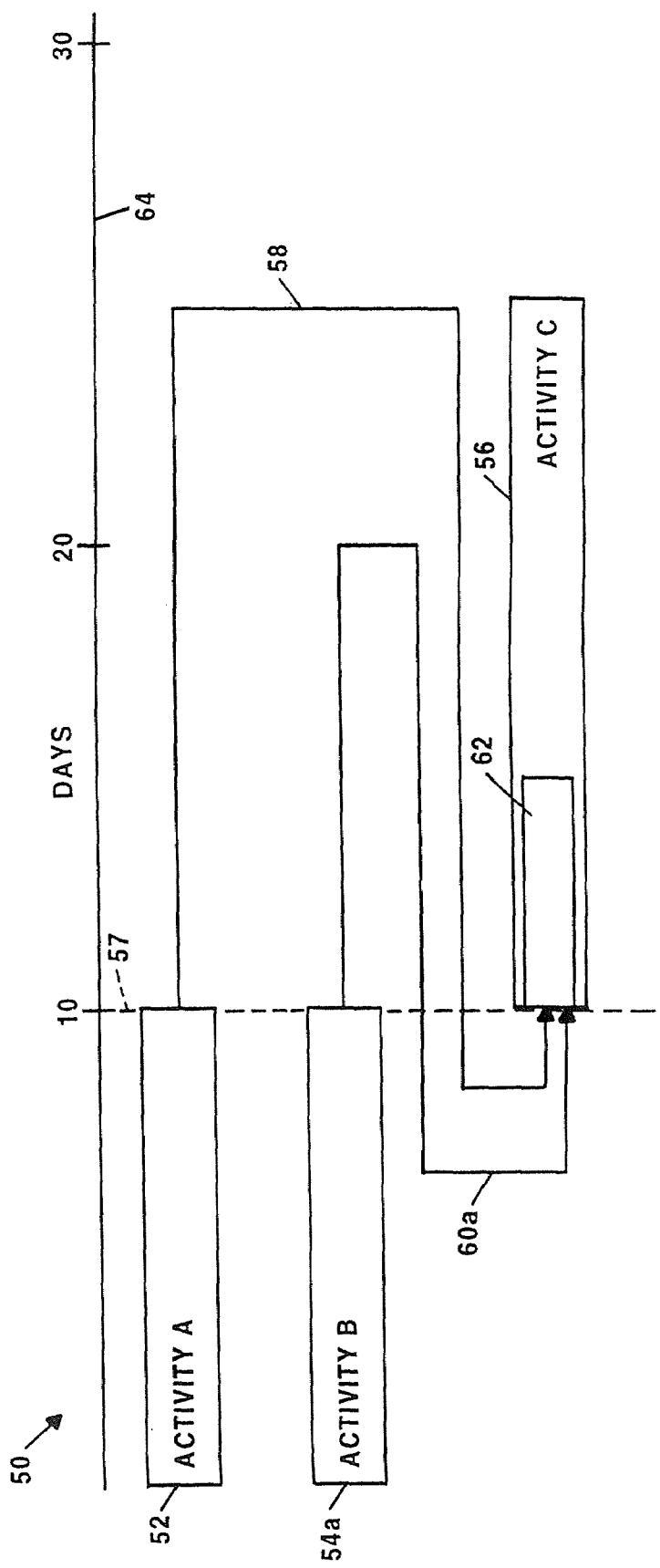
FIG. 2 is a chart of a project plan which includes a reliability buffer applied at a merging point of the project plan in accordance with this invention.

Referring now to FIG. 2, a project plan chart 50 includes time bars 52, 54a, 56 associated with three respective activities A, B, C having an FS relationship at a merging point 57. As shown in FIG. 2, activities A and B are upstream with respect to activity C and activity C is downstream with respect to activities A and B. The project plan chart 50 corresponds to an initially planned schedule. A time scale 64 represents illustrative times associated with the various time bars 52, 54a, 56. Activities A, B and C thus have durations represented by the associated time bars 52, 54a, 56.

Activity A and activity B each have an FS relationship 58, 60a with activity C. A reliability buffer time bar 62 is disposed on a first region of the activity time bar 56. Thus, rather than utilizing the prior art approach of providing contingency buffers appended to the ends of time bars 52, 54a associated with activities A and B, in accordance with the present invention, the reliability buffer 62 is associated with activity C. In the example of FIG. 2, the reliability buffer 62 is placed at the beginning of time bar 56 associated with activity C.

The reliability buffer 62 is applied at the merging point 57 between upstream activities A and B and downstream activity C. The reliability buffer 64 is associated with the beginning of activity C, unlike the contingency buffers 22, 24 of FIG. 1 that are associated with the end of activities A, B. It should be appreciated that although the reliability buffer 64 is here shown to be part of activity C, it can also be considered separately from activity C. In some project plan charts below, the reliability buffer is shown separately from the downstream activity with which it is most closely associated. When shown separately, it has a "buffer time precedence relationship" that is FS with the downstream activity. It should be understood, however, that other buffer time precedence relationships between the reliability buffer 62 and the downstream activity are also possible.

As with the example of FIG. 1, the anticipated duration of both activity A and activity B is 10 days, yet no contingency buffer beyond this duration has been applied to activity A or activity B. The initially planned activities A, B, C have a total duration of 25 days.

Figure 2A:
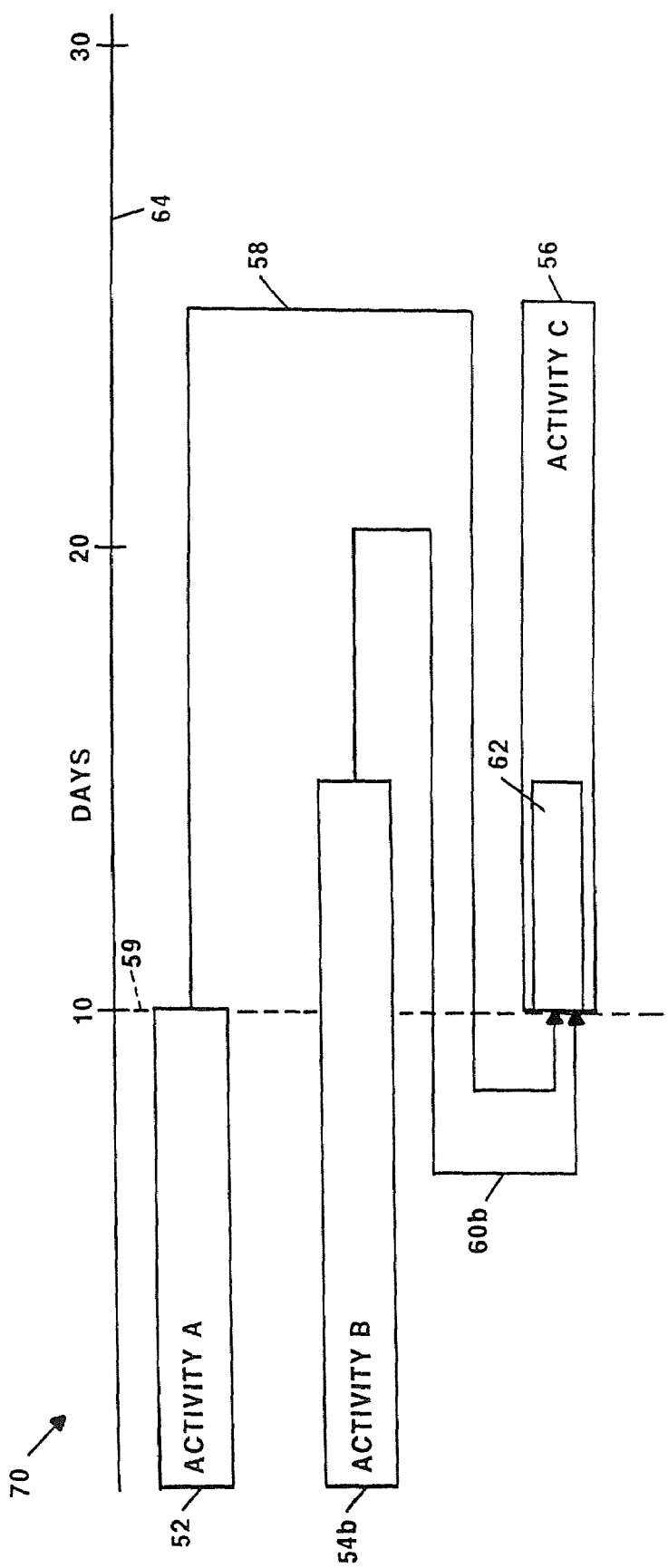
FIG. 2A is another chart of a project plan which includes a reliability buffer applied at a merging point.

Referring now to FIG. 2A, in which like elements of FIG. 2 are provided having like reference designations, another illustrative example is shown of a project plan chart 70, which includes time bars 52, 54b, 56 associated with three respective activities A, B, C having an FS relationship at a merging point 59. As shown in FIG. 2A, activities A and B are upstream with respect to activity C and activity C is downstream with respect to activities A and B. The project plan chart 70 corresponds to an initially planned schedule. A time scale 64 represents illustrative times associated with the various time bars 52, 54b, 56. Activities A, B and C thus have durations represented by the associated time bars 52, 54a, 56.

Here, unlike the illustrative example of FIG. 2, the actual, or updated, duration of activity B has increased from the initially planned activity B of FIG. 2, by a delay period of five days. The reliability buffer 62 absorbs the delay to the extent available in the reliability buffer 62, here 5 days. In comparison with FIG. 1, note that the total duration of the three activities A, B, C has remained 25 days, even though activity B has a delayed schedule.

Also, in comparison with FIG. 1A, the actual durations of activity A and activity B are the same as activity A and activity B of FIG. 1A, but the total time duration for the three activities A, B, and C can be seen to be 25 days, compared with 30 days required in the prior art approach of FIGS. 1 and 1A. Thus, unlike prior art contingency buffer approach which provides no schedule benefit at a merging point, the reliability buffer 62 of the present invention provides schedule benefit as indicated by the early finish of activity C.

Referring now to FIG. 3, a project management system 100 includes a project plan processor 102 which provides conventional project plan data 104 to a project data processor 106. Conventional project plan data 104 can have a variety of conventional project plan data elements, but generally includes a list of activities, an activity duration value associated with each activity, and time precedence relationship data that describes the time precedence relationships between the various activities of the project plan, including in some instances lead and lag times.

As described in U.S. patent application Ser. No. 10/068, 119, entitled Dynamic Planning Method and System, filed on Feb. 6, 2002, and assigned to the assignee of the present invention and incorporated herein by reference in its entirety, conventional project plan data can be transferred to the project data processor 106 of the present invention from a conventional project management computer tool such as PERT. Alternatively, conventional project plan data can be provided to the project data processor 106 by users via user interfaces associated with the project data processor 106.

Conventional project plan data 104 provided by the project plan processor 102 can include conventional activity characteristics data, activity relationship data and policy data. The project data processor 106 receives the conventional project plan data 104 and allows the user to both alter the conventional project plan data and/or to add additional project plan data elements to the conventional project plan data via one or more user interfaces. The user can provide additional activity relationship data 108, activity characteristics data 110, and policy data 112.

A portion of the project plan data 104 can correspond to conventional activity relationship data denoted by reference numeral 104a in FIG. 3, and includes time precedence relationship data that relates pairs of activities together. Such time precedence relationship data includes, for example, finish to start (FS), start to start (SS), finish to finish (FF), and start to finish (SF) relationships. Activity time precedence relationship data can also include lead or lag times. For example, a second activity can be planned to start, with lead, before the end of a first activity in an FS relationship, or can be planned to start, with lag, at some time after the finish of the first activity.

Activity relationship data 108 can be provided to include a downstream sensitivity value. The downstream sensitivity, or generally the sensitivity, is a value that describes the strength of the coupling from a given downstream activity to an upstream activity with which it is associated by a time precedence relationship. For example, two activities in an FS relationship can be strongly or weakly coupled via the downstream sensitivity value. A strong coupling requires that a downstream activity cannot be started until the finish of the given activity. A weak coupling implies that the downstream activity can start before the completion of a given activity, though they are linked in an FS relationship. Essentially, the downstream sensitivity value can effect lead and lag durations. Since a downstream activity can have time precedence relationships with a number of upstream activities, the downstream sensitivity values are most closely associated with the time precedence relationships of a downstream activity, rather than with the downstream activity itself.

A portion of the project plan data 104 can correspond to conventional activity characteristics data 104b, and includes an activity name, an activity duration value, and an activity duration probability, each having been described above.

Activity characteristics data 110 can also be provided to include an activity production type value, and an activity reliability value. The activity production type value describes the ramp up or progress speed of an activity in relation to a normal production rate for the activity. For example, an activity may be planned to have a two-month duration, an it may quickly ramp up to achieve the first half of the activity in less than one month. In this example, the activity is planned having a fast production rate value.

The activity reliability value describes both the likelihood that the activity achieves the planned duration and schedule, and the likelihood that the output work product of the activity will be of sufficient quality so as not to impact the schedule of downstream activities. The activity reliability value is associated with an activity rather than a relationship between activities.

A portion of the project plan data 104 can correspond to conventional policy data 104c such as overlapping and splitting of activities. Splitting of activities is understood to correspond to a policy that allows activities to be started, stopped and re-started again. Policy data 112 can also be provided to include project policies such as manpower availability versus time values, overtime and flexibility of worker headcount control values, a buffering policy, thoroughness of quality control values, hiring time control values, and request for information (RFI) time control values. The buffering policy as used above should be understood to correspond to a policy that allows the user to apply time buffers, other than reliability buffers (e.g. contingency buffers), to a project schedule.

Activity relationship data 114, activity characteristics data 116, and policy data 118 are provided to the reliability buffer processor 120. The reliability buffer processor 120 removes any contingency buffers that are provided as part of the conventional project plan data 104. The reliability buffer processor 120 also associates reliability buffers with the beginning of selected ones of the activities, sizes the duration of each reliability buffer, and provides new precedence relationships between each reliability buffer and the activities that are upstream from the selected ones of the activities.

Reliability buffer characteristics are influenced by the activity relationship data 114, the activity characteristics data 116, and the policy data 118. For example, the reliability buffer lead/lag and the reliability buffer duration value are influenced by a portion of the policy data 118 corresponding to the production type value, and by the reliability value. The reliability buffer associated with a downstream activity can be short, which makes it possible to overlap the associated upstream and downstream activities, if the upstream activity has a fast production type value and is reliable. This is because an upstream activity having a fast production type value and high reliability value requires a relatively short time to review and correct upstream problematic work within an associated downstream activity. Normally, an upstream activity having a relatively low activity reliability value, thus indicating potentially low quality work, requires consideration of the possibility that downstream changes will be required. This results in the generation of a reliability buffer having a relatively large duration value and having more lag. Similarly, an upstream activity having a slow production type value and a low reliability value requires a reliability buffer having a relatively large duration value, to anticipate the necessity to discover and fix problematic upstream work at the beginning of the downstream activity.

For another example, the reliability buffer duration value and lead/lag are influenced by the activity sensitivity value. If a sensitivity value associated with a time precedence relationship between an upstream and a downstream activity indicates a relatively high coupling between the upstream activity and the associated downstream activity, then it is more likely that a schedule delay in the upstream activity will cause a schedule impact on the downstream activity. Thus in this case, a reliability buffer would be generated in association with the downstream activity, having a relatively long duration value and with more lag.

For yet another example, the reliability buffer duration value and lead/lag are influenced by the combination of the data 104c and policy data 112 such combination designated as 118 in FIG. 3. If the manpower is unlikely to be available at the time of a given activity, the reliability buffer processor 120 would produce a reliability buffer having a relatively long duration value and a corresponding amount of lag.

Where the reliability buffer is automatically sized and placed in a time precedence relationship by the reliability buffer processor 120, it is possible to provide an appropriate reliability buffer duration value and activity time precedence relationship, having a lead or lag, for each activity in a systematic manner, depending upon activity relationship data 114, activity characteristics data 116 and policy data 118. As a result, the reliability buffer processor 120 provides a project plan 122 having embedded reliability buffers.

Figure 4:
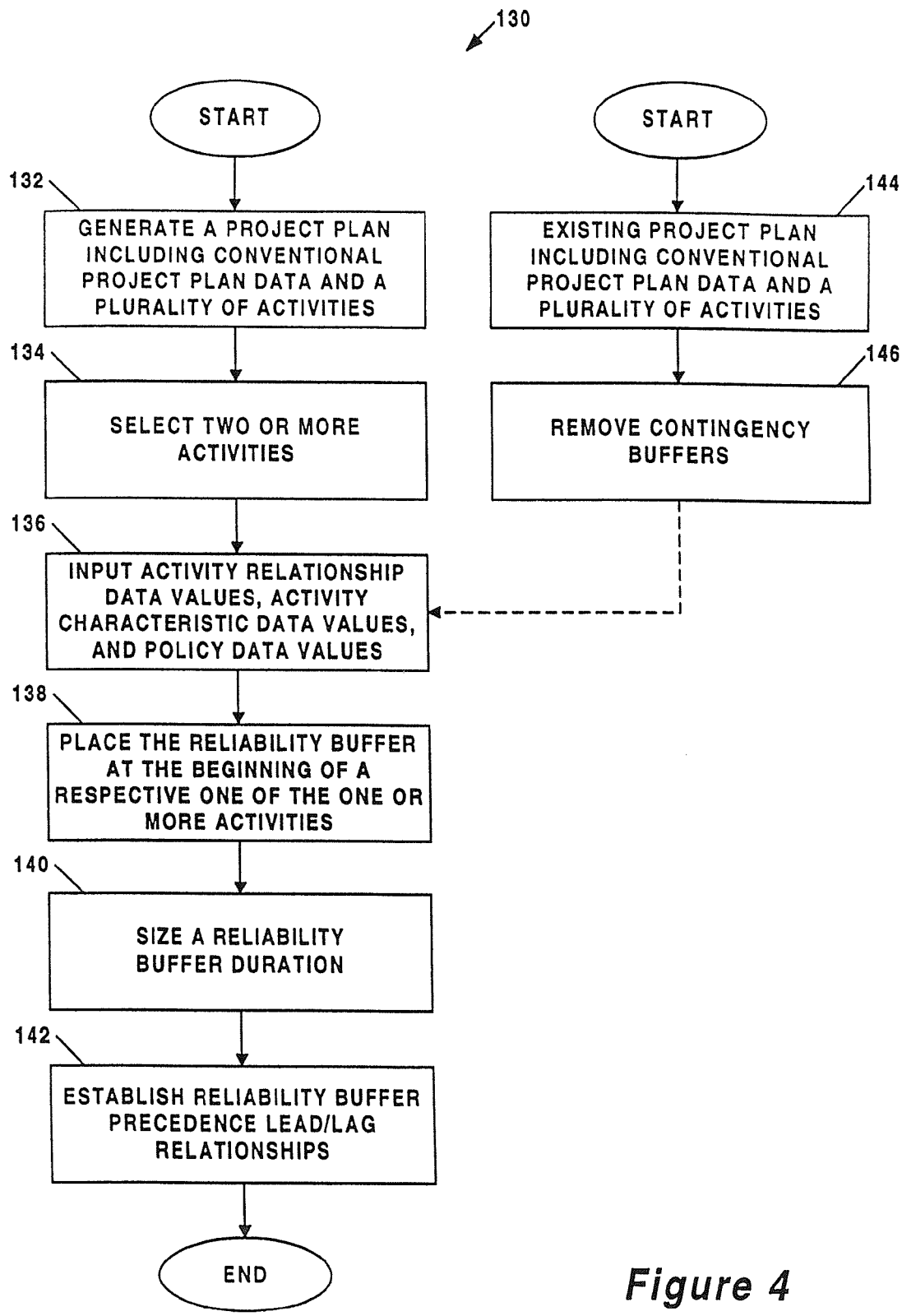
FIG. 4 is a flow diagram showing the process for generating a project planning model that includes one or more reliability buffers.

Referring now to FIG. 4, a process 130 for generating a project plan with reliability buffers begins by generating a project plan that includes a plurality of activities and a variety of conventional project plan data as shown in block 132. The conventional project plan data can include the list of activities, the activity duration value associated with each activity, the activity time precedence relationships between each activity and one or more other activities, a path probability value corresponding to the likelihood that a time precedence relationship will be achieved as planned, and probabilistic branching of time precedence relationships.

The project plan provided at step 132 can also include other types of conventional project plan data. Of the activities thus generated, two or more activities are selected at step 134, each having conventional project plan data. To the conventional project plan data associated with the selected activities, further project plan data is provided as shown in 136 where additional activity relationship data values, activity characteristics data values, and activity policy data values are provided. At step 138, based upon the activity relationship data, the activity characteristics data, and the policy data, reliability buffers are placed at the beginning of some or all of the selected activities. At step 140, the reliability buffers are sized, to provide time duration values for each of the reliability buffers. At step 142, the time precedence relationships, including lead and lag are established for each of the reliability buffers. Thus, a project plan that incorporates reliability buffers is generated.

Calculation of the reliability buffer duration value and the time precedence relationship, including lead/lag values, are determined based on simulation results. The calculations provide a reduction of the impact on total project schedule caused by schedule problems associated with individual activities. The calculations also provide an increase in the overall project schedule benefits that result from any schedule advances of individual activities.

In particular, the reliability duration value can be calculated by selecting a plurality of reliability buffer duration values and, for each of the plurality of reliability buffer duration values, generating a simulated project schedule and a simulated project cost. A reliability buffer duration value and associated project schedule can be selected that correspond to a smallest simulated project schedule or a smallest simulated project cost. The selection between the smallest project schedule or smallest schedule cost can be made by user selection upon a graphical user interface (GUI). The lead/lag values are calculated in accordance with descriptions given in association with FIGS. 7-7C below.

Alternatively, conventional project plan data can be incorporated at step 144 as input from a conventional project planning computer tool, for example PDM. PDM will be recognized by one of ordinary skill in the art to be a computer tool that provides the list of activities, the duration value associated with each activity, and one or more time precedence relationships between each activity and other activities. Where the conventional project plan data includes contingency buffers, the contingency buffers are first removed from the conventional project plan data at step 146. The conventional project plan data then follows the process described above, beginning a step 134.

Figure 5:
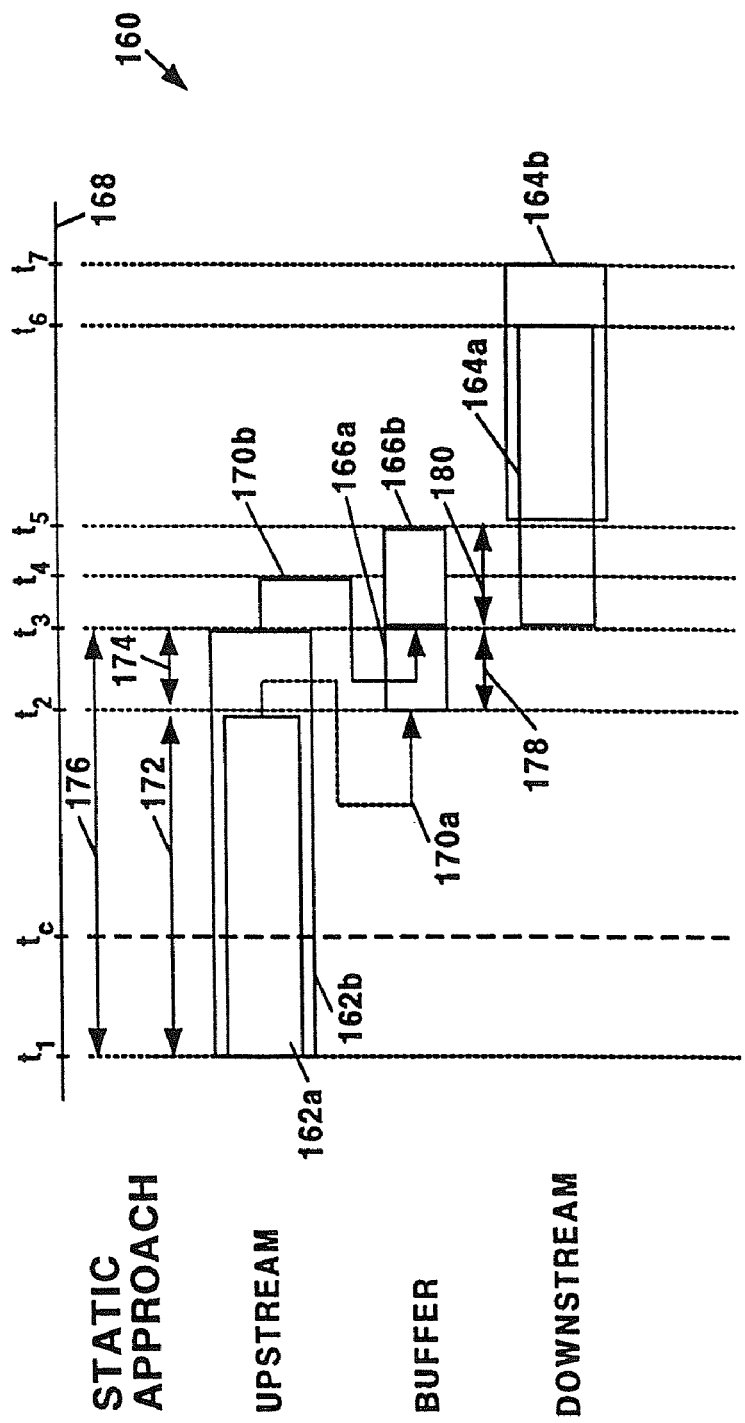
FIG. 5 is a project plan chart showing an illustrative time precedence relationship between two activities including a reliability buffer generated by a static approach.

Referring now to FIG. 5, a project plan chart 160 showing an illustrative example of a static approach is shown. A project plan chart 160 includes an initially planned upstream activity 162a, an updated upstream activity 162b, an initially planned downstream activity 164a, an updated downstream activity 164b, an initially planned reliability buffer 166a, and an updated reliability buffer 166b. As will become apparent below, the static approach provides no changes in time precedence relationships as the schedule is updated. In contrast, dynamic reliability buffering shown in FIG. 5A allows initially sized and placed reliability buffers, and time precedence relationships, to vary throughout the project duration. As mentioned above, the reliability buffer 166a, 166b is shown apart from the downstream activity 164a, 164b with which is it most closely associated. A time scale 168 progresses from left to right. Initially planned and the updated time precedence relationships are indicated by arrows designated, respectively, by reference numerals 170a, 170b.

An initial plan comprised of activities is indicated as cross-hatched time interval bars 162a, 164a, 166a in FIG. 5. An updated plan comprised of activities updated at time $t_c$, is indicated by solid time interval bar boundaries 162b, 164b, 166b. In general, an updated plan can be generated by a user any time that new data is obtained. The updated plan corresponds to a manual data entry update by a user at time $t_c$ that subsequently causes a re-calculation of reliability buffers, and of the overall project schedule and all remaining activities within the project. The data entry update corresponds to a new entry of some or all of the project plan data.

The upstream activity 162b has an updated completion time at $t_3$, that is delayed from the initially planned completion time of activity 162a (having an initially planned duration 172) by a period of time computed as $t_3$-$t_2$ and designated with reference numeral 174 in FIG. 5. It should be noted that the updated, or actual, duration of the activity 162b (having an actual duration 176) is increased from that initially planned 162a. In the static buffering approach 160, the delay 174 in the upstream activity completion is directly passed to the downstream activity by delaying the updated start time, $t_3$, of the reliability buffer 166b and consequently the updated start time, $t_5$, of the downstream activity 164b. The initial FS relationship 170a having no lead between the upstream activity 162a and the reliability buffer 166a remains unchanged as activity 162b is delayed. The reliability buffer duration value 178, 180 also remains unchanged. Thus, a static approach can be used to adjust the project schedule based upon new data knowledge, for example knowledge that an activity has actually been completed. Note that the updated downstream activity 164b has an updated delayed start at time $t_5$.

Figure 5A:
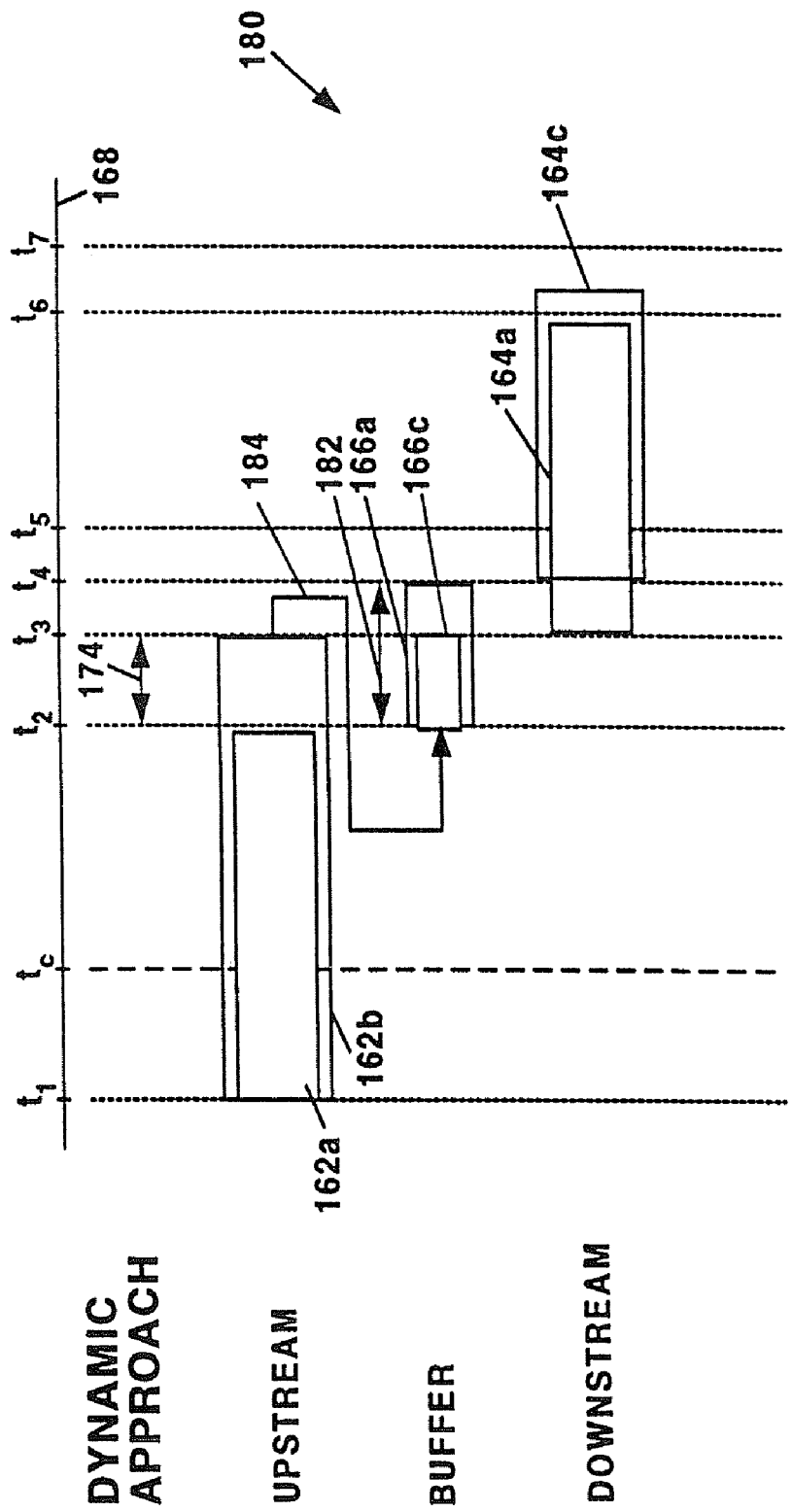
FIG. 5A is a project plan chart which illustrates a time precedence relationship between two activities including a reliability buffer generated by a dynamic approach.

Referring now to FIG. 5A, in which like elements of FIG. 5 are provided having like reference designations, a project plan chart 160 showing an illustrative example of a dynamic approach to buffering includes an updated reliability buffer 166c applied by a process that can be the process as described in association with FIG. 4. The project plan chart characteristics and the time scale are the same as those of FIG. 5.

In contrast to FIG. 5, the impact of the updated upstream activity 162b completion delay 174 from time $t_2$ to time $t_3$, on the downstream activity time schedule, is reduced by dynamically adjusting, rather than statically adjusting, the reliability buffer 166c. Dynamic adjustment is made by adjusting both the reliability buffer duration value 182 and the lead/lag of the time precedence relationship 184 between the upstream activity and the reliability buffer at the update time, $t_c$. As above, the adjustment corresponds to a project plan data update performed by a user at time $t_c$ based upon new information. Here, the new information is that the upstream activity can not been completed by the initially anticipated and planned time, $t_2$.

It should be recognized that the time precedence relationship 184 to the upstream activity 162b, initially having an FS relationship with no lead or lag, is updated to have lead with respect to the upstream activity 162b (i.e. the updated reliability buffer begins prior to the finish of the upstream activity). Also, the reliability buffer duration value 182 is increased to provide a longer updated reliability buffer 166c from that initially planned 166a. Note that the delay in the start of the downstream activity 164c is improved from that of the static approach 164b by a time value of $t_5$-$t_4$.

Figure 6:
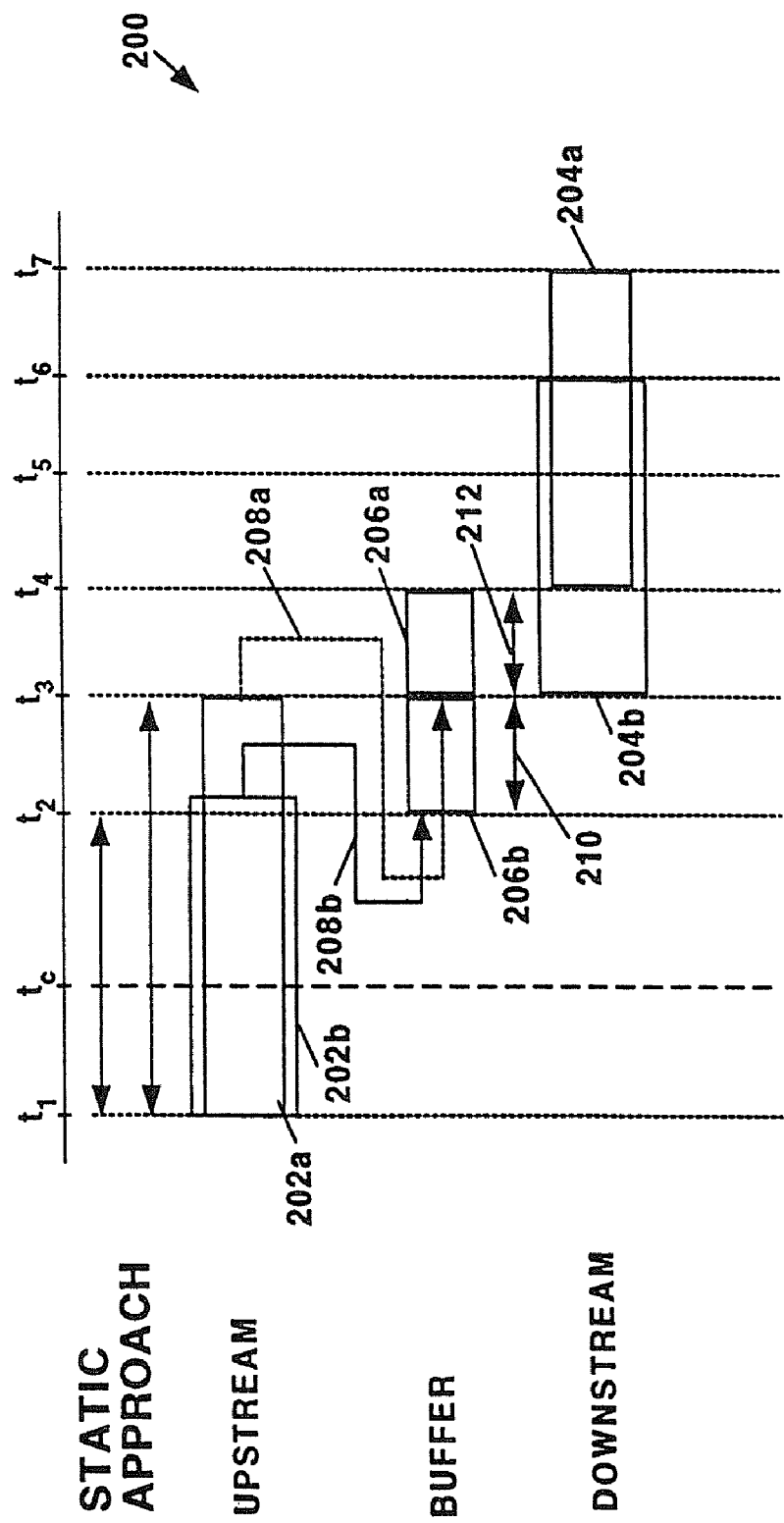
FIG. 6 is a project plan chart which illustrates a time precedence relationship between two activities including a reliability buffer generated by the static approach.

Referring now to FIG. 6, a project plan chart 200 showing another illustrative example of a static approach to buffering includes an initially planned upstream activity 202a, an updated upstream activity 202b, an initially planned downstream activity 204a, an updated downstream activity 204b, an initially planned reliability buffer 206a, and an updated reliability buffer 206b. In this illustrative example, the upstream activity 202b has finished earlier than that anticipated by the initial schedule 202a, in contrast to FIGS. 5 and 5A in which the upstream activity 162b finished later. In this illustrative example, the activities and the reliability buffer of the static approach 200 are updated at time $t_c$. Using the static approach, the initially planned FS time precedence relationship 208a remains an FS time precedence relationship 208b when the plan is updated. The time duration value 210 of the updated reliability buffer remains unchanged from the initially planned duration value 212. Rather, at a schedule update, where the upstream activity 202b has been completed earlier than anticipated, the reliability buffer 206b is moved earlier in time and the corresponding downstream activity 204b is moved earlier in time. With the static approach, the downstream activity begins at a time $t_3$ and ends at a time $t_6$, earlier than the original plan that ended at time $t_7$.

Figure 6A:
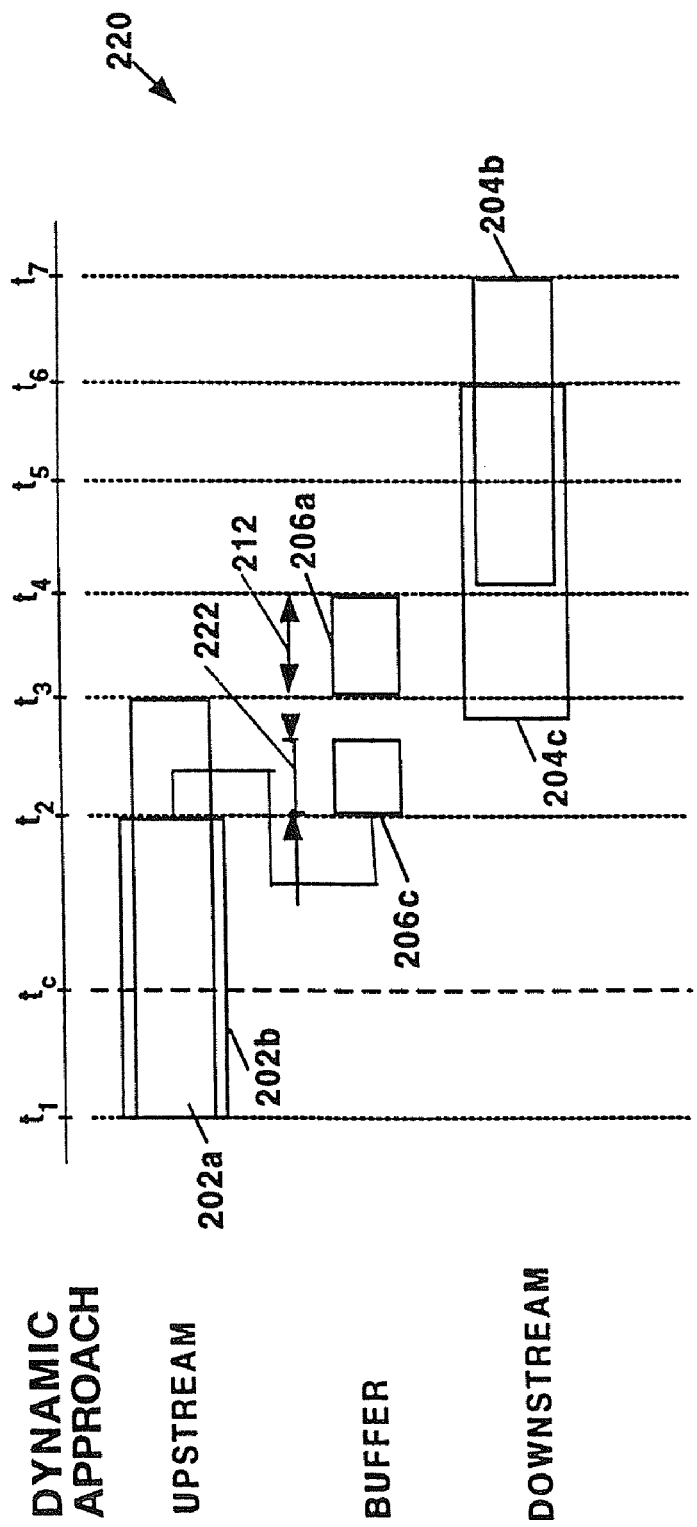
FIG. 6A is a project plan chart which illustrates a time precedence relationship between two activities including a reliability buffer generated by the dynamic approach.

Referring now to FIG. 6A, in which like elements of FIG. 6 are provided having like reference designations, a project plan chart 220 showing another illustrative example of a dynamic approach to buffering includes an updated reliability buffer 206c applied by a process that can be the process described in association with FIG. 4.

In this illustrative example, the activities and the reliability buffer of the dynamic plan 220 are updated at time $t_c$ as in the example pf FIG. 6. When the upstream activity 202b is completed early at time $t_2$, the reliability buffer 206c, originally in an FS relationship with the upstream activity, and without lag, maintains the same relationship, yet is given a smaller time duration value 222. It can been seen that the project schedule benefits from the early completion of the upstream activity. Comparing the dynamic approach of FIG. 6A with the static approach of FIG. 6, it can be seen that the dynamic approach affords a greater advancement in the overall project schedule than the static approach. Specifically, the downstream activity 204c of the dynamic approach 220 shows an earlier start and earlier completion of the downstream activity than that of the downstream activity 204b of the static approach 200.

In general, reliability buffering adopting a dynamic buffering approach provides a project plan for which the start date of initially planned downstream activities can be maintained with minimal impact from delays in the completion of upstream activities. Furthermore, if any schedule advances are made in the upstream work, the downstream work can benefit from the schedule advances.

FIGS. 5A and 6A are illustrative examples of the dynamic approach of reliability buffering applied to one particular time precedence relationship, (i.e. an FS time precedence relationship), and the effect that schedule changes to the upstream activity have on the reliability buffer associated with the downstream activity. However, there are four time precedence relationships, FS, SS, FF, and SF. There are also alternatives of both lead and lag associated with each of the four time precedence relationships. Examples of these situations will be summarized in subsequent figures.

Figure 7:
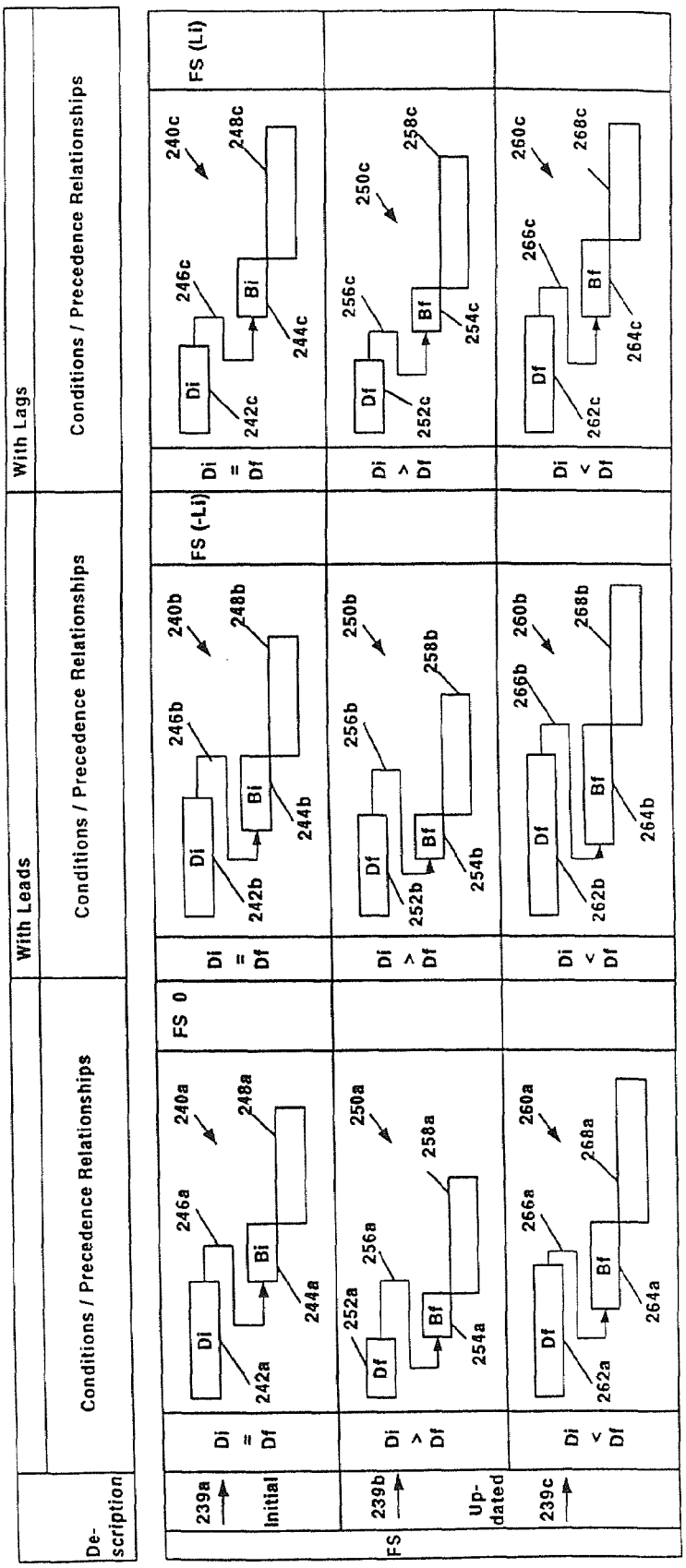
FIG. 7 is a table having listed therein a plurality of different project plan charts each having a different finish to start (FS) time precedence relationships and including a reliability buffer generated by the dynamic approach.

Referring now to FIG. 7, a table illustrating time precedence relationships between upstream activities, downstream activities, and reliability buffers associated with the downstream activities is shown. Each of the rows 239a-239c show an FS time precedence relationship 246a-246c, 256a-256c, 266a-266c between an upstream activity 242a-242c, 252a-252c, 262a-262c and a downstream activity 248a-248c, 258a-258c, 268a-268c. It should be appreciated that reliability buffers 244a-244c, 254a-254c, 264a-264c are taken as part of the downstream activity 248a-248c, 258a-258c, 268a-268c. These time precedence relationships 246a-246c, 256a-256c, 266a-266c are also referred to herein as an "activity" time precedence relationships, as opposed to the buffer time precedence relationship described above that provides a relationship between the reliability buffer and the downstream activity, for example the reliability buffer 244a and the downstream activity 248a. Other activity time precedence relationships are shown in figures below. In row 239a, an initial (anticipated) schedule 240a-240c of an upstream activity 242a-242c is shown where an initially planned duration value, $D_i$, for an upstream activity is equal to an updated duration value, $D_f$, associated with the upstream activity.

Rows 239b, 239c show two forms of updated project schedules. First in row 239b, a schedule 250a-250c is shown for which $D_i$ is greater than $D_f$, i.e., the upstream activity has been updated to finish earlier than the initial schedules 240a-240c shown in row 239a. In row 239c, schedules 260a-260c are shown for which $D_i$ is less than $D_f$, i.e., the upstream activity has been updated to finish later than anticipated in the initial schedules 240a-240c shown in row 230a. The FS relationship between an upstream activity and a reliability buffer is provided without a lead or lag in schedules 240a, 250a, 260a, with a lead in schedules 240b, 250b, 260b, and with a lag in schedules 240c, 250c, 260c.

In the schedule 240a having no initially planned lead or lag, when the initially planned upstream activity 242a is updated to have a smaller duration value 252a than originally anticipated as shown in schedule 250a, a reliability buffer 254a is generated (e.g. via the reliability buffer processor of FIG. 3) having a shorter duration value than the original reliability buffer 244a. A time precedence relationship 256a between the upstream activity 252a and the reliability buffer 254a remains FS with no lead or lag. Conversely, when the initially planned upstream activity 242a is updated to have a larger duration value 262a than originally anticipated as shown in schedule 260a, a reliability buffer 264a is generated that has both a larger duration value than the original reliability buffer 244a, and also has a lead corresponding to $-(D_f-D_i)$.

In the schedule 240b having initially planned lead, $-L_i$, when the initially planned activity 242b is updated to have a smaller duration value 252b than originally anticipated as shown in schedule 250b, a reliability buffer 254b is generated having a shorter duration value than the original reliability buffer 244b, while maintaining the same lead relationship 256b, $-L_i$. Such a reliability buffer may be generated, for example, via the reliability buffer processor of FIG. 3. Conversely, when the initially planned upstream activity 242b is updated to have a larger duration value 262b than originally anticipated as shown in schedule 260b, a reliability buffer 264b is generated that has both a larger duration value than the original reliability buffer 244b, and also has a larger lead corresponding to $-(L_i+(D_f-D_i))$.

In the schedule 240c having initially planned lag, $L_i$, when the initially planned upstream activity 242c is updated to have a smaller duration value 252c than originally anticipated as shown in schedule 250c, a reliability buffer 254c is generated (e.g. via the reliability buffer processor of FIG. 3) having a shorter duration value than the original reliability buffer 244c, while maintaining the lag relationship 256c, Li. Conversely, when the initially planned upstream activity 242c is updated to have a larger duration value 262c than originally anticipated as shown in schedule 260c, a reliability buffer 264c is generated that has both a larger duration value than the original reliability buffer 244c, and also has a smaller lag or no lag 266c corresponding to $L_i-(D_f-D_i)$. Note also that this relationship 266c can generate a lead when $D_f-D_i$ is greater than $L_i$, i.e. when the upstream activity 262c is completed far behind schedule.

The activity time precedence relationship provided here is shown between the reliability buffer 244a-244c, 254a-254c, 264a-264c and the respective upstream activity 242a-242c, 252a-252c, 262a-262c. For the purpose of time precedence relationships, as mentioned above, the reliability buffer 244a-244c, 254a-254c, 264a-264c can be considered in combination with the respective downstream activity 248a-248c, 258a-258c, 268a-268c to provide a buffered downstream activity.

Figure 7A:
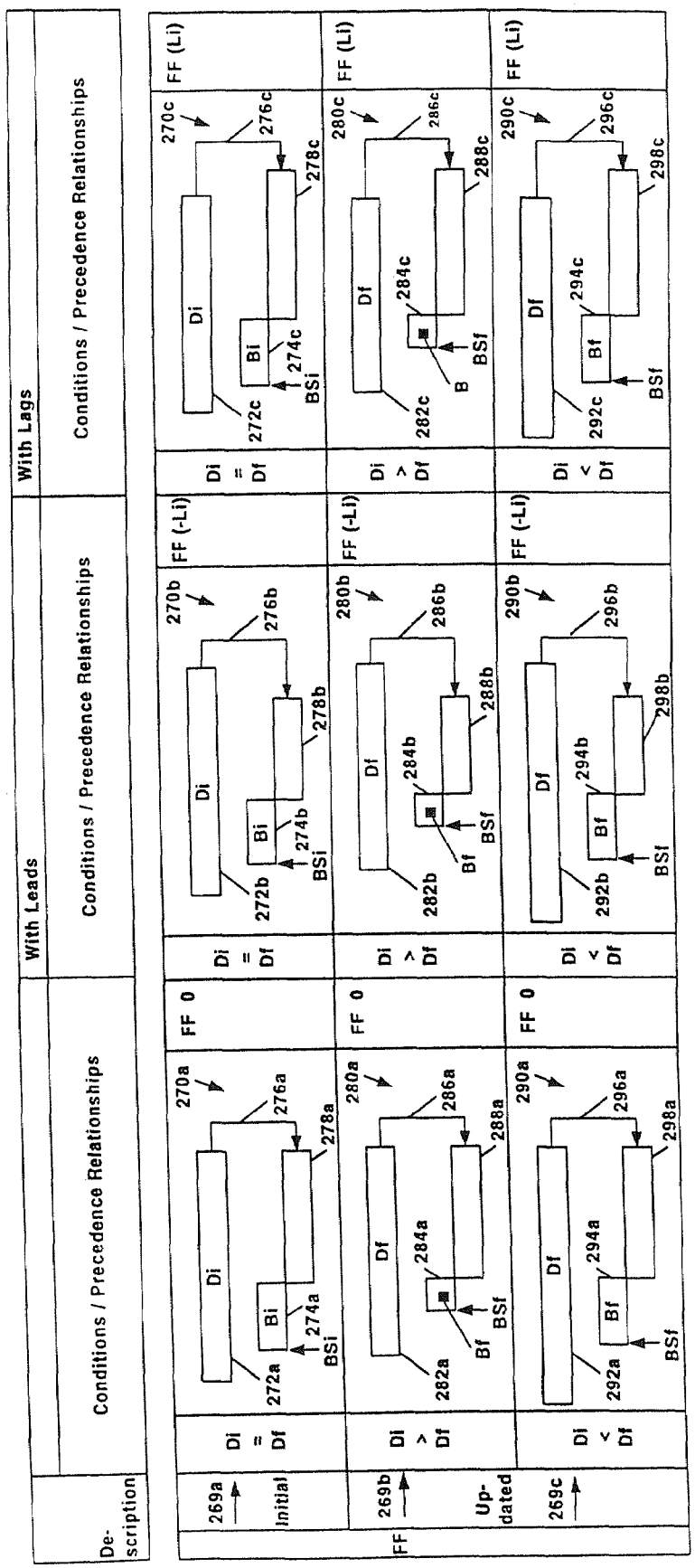
FIG. 7A is a table having listed therein a plurality of different project plan charts each having a different finish to finish (FF) time precedence relationship and including a reliability buffer generated by the dynamic approach.

Referring now to FIG. 7A, a table illustrating time precedence relationships between upstream activities, downstream activities, and reliability buffers associated with the downstream activities is shown. Each of the rows 269a-269c show an FF time precedence relationship 276a-276c, 286a-286c, 296a-296c between an upstream activity 272a-272c, 282a-282c, 292a-292c and a downstream activity 278a-278c, 288a-288c, 298a-298c. It should be appreciated that reliability buffers 274a-274c, 284a-284c, 294a-294c are taken as part of the downstream activity 278a-278c, 288a-288c, 298a-298c. Other time precedence relationships are shown in figures below. In row 269a, an initial (anticipated) schedule 270a-270c of an upstream activity 272a-272c is shown where an initially planned duration value, $D_i$, for an upstream activity is equal to an updated duration value $D_f$, associated with the upstream activity.

Rows 269b, 269c show two forms of updated project schedules. First in row 269b, a schedule 280a-280c is shown for which $D_i$ is greater than $D_f$, i.e., the upstream activity has been updated to finish earlier than the initial schedule 270a-270c shown in row 269a. In row 269c, a schedule 290a-290c is shown for which $D_i$ is less than $D_f$, i.e., the upstream activity has been updated to finish later than anticipated in the initial schedules 270a-270c shown in row 269a. The FF relationship is shown without a lead or lag in schedules 270a, 280a, 290a, with a lead in schedules 270b, 280b, 290b, and with a lag in schedules 270c, 280c, 290c.

In the schedule 270a having no initially planned lead or lag, when the initially planned upstream activity 272a is updated to have a smaller duration value 282a than originally anticipated as shown in schedule 280a, a reliability buffer 284a is generated (e.g. via the reliability buffer processor of FIG. 3) having a shorter duration value than the original reliability buffer 274a. The time precedence relationship 286a between the upstream activity 282a and the downstream activity 288a remains FF with no lead or lag. Conversely, when the initially planned upstream activity 272a is updated to have a larger duration value 292a than originally anticipated as shown in schedule 290b, a reliability buffer 294a is generated that has a larger duration value than the original reliability buffer 274a. The time precedence relationship 296a between the upstream activity 282a and the downstream activity 288a remains FF with no lead or lag.

In the schedule 270b having initially planned lead, $-L_i$, when the initially planned activity 272b is updated to have a smaller duration value 282b than originally anticipated as shown in schedule 280b, a reliability buffer 284b is generated having a shorter duration value than the original reliability buffer 274b, while maintaining the same lead relationship 276b, 286b, $-L_i$. Such a reliability buffer may be generated, for example, via the reliability buffer processor of FIG. 3. Conversely, when the initially planned upstream activity 272b is updated to have a larger duration value 292b than originally anticipated as shown in schedule 290b, a reliability buffer 294b is generated that has a larger duration value than the original reliability buffer 274b. The time precedence relationship 296b maintains the original lag, $-L_i$.

In the schedule 270c having initially planned lag, $L_i$, when the initially planned upstream activity 272c is updated to have a smaller duration value 282c than originally anticipated as shown in schedule 280c, a reliability buffer 284c is generated (e.g. via the reliability buffer processor of FIG. 3) that has a shorter duration value than the original reliability buffer 274c, while maintaining the lag relationship 286c, Li. Conversely, when the initially planned upstream activity 272c is updated to have a larger duration value 292c than originally anticipated as shown in schedule 290c, a reliability buffer 294c is generated that has a larger duration value than the original reliability buffer 274c. The time precedence relationship 296c maintains the original lead, $L_i$.

The activity time precedence relationship provided here is between the downstream activity 278a-278c, 288a-288c, 298a-298c and the respective upstream activity 272a-272c, 282a-282c, 292a-292c. For the purpose of time precedence relationships, as mentioned above, the reliability buffer 274a-274c, 284a-284c, 294a-294c can be considered in combination with the respective downstream activity 278a-278c, 288a-288c, 298a-298c to provide a buffered downstream activity.

Figure 7B:
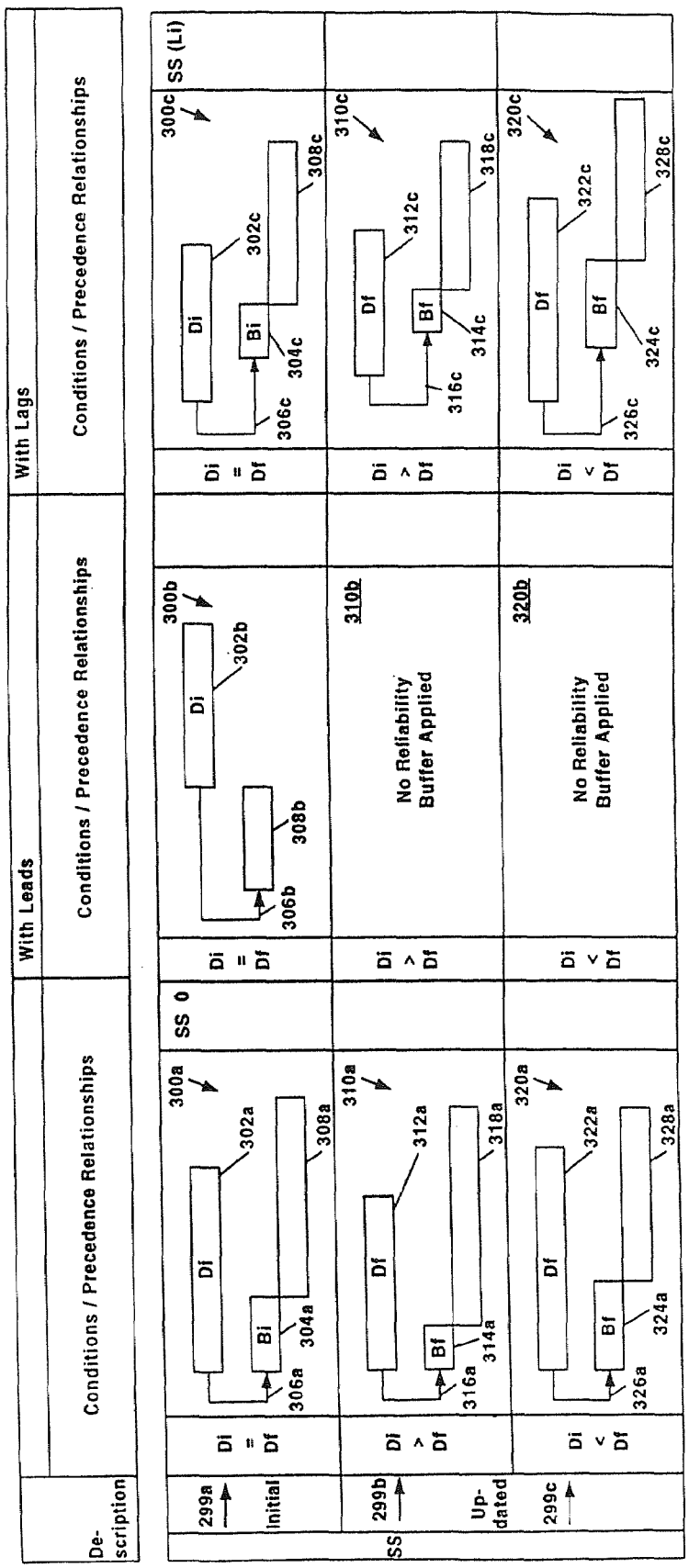
FIG. 7B is a table having listed therein a plurality of different project plan charts each having a different start to start (SS) time precedence relationship and including a reliability buffer generated by the dynamic approach.

Referring now to FIG. 7B, a table illustrating time precedence relationships between upstream activities, downstream activities, and reliability buffers associated with the downstream activities is shown. Each of the rows 299a-299c show an SS time precedence relationship 306a-306c, 316a, 316c, 326a, 326c between an upstream activity 302a-302c, 312a, 312c, 322a, 322c and a downstream activity 308a-308c, 318a, 318c, 328a, 328c. It should be appreciated that reliability buffers 304a-304c, 314a, 314c, 324a, 324c are taken as part of the downstream activity 308a-308c, 318a, 318c, 328a, 328c. Other time precedence relationships are shown in figures below. In row 299a, an initial (anticipated) schedule 300a-300c of an upstream activity 302a-302c is shown where an initially planned duration value, $D_i$, for an upstream activity is equal to an updated duration value, $D_f$, associated with the upstream activity.

Rows 299b, 299c show two forms of updated project schedules. First in row 299b, a schedule 310a-310c is shown for which $D_i$ is greater than $D_f$, i.e., the upstream activity has been updated to finish earlier the initial schedule 300a-300c shown in row 299a. In row 299c, a schedule 320a-320c is shown for which $D_i$ is less than $D_f$, i.e., the upstream activity has been updated to finish later than anticipated in the initial schedules 300a-300c shown in row 299a. The SS relationship is shown without a lead or lag in schedules 300a, 310a, 320a, with a lead in schedules 300b, 310b, 320b, and with a lag in schedules 300c, 310c, 320c.

In the schedule 300a having no initially planned lead or lag, when the initially planned upstream activity 302a is updated to have a smaller duration value 312a than originally anticipated as shown in schedule 310a, a reliability buffer 314a is generated (e.g. via the reliability buffer processor of FIG. 3) having a shorter duration value than the original reliability buffer 304a. A time precedence relationship 316a between the upstream activity 312a and the reliability buffer 314a remains SS with no lead or lag. Conversely, when the initially planned upstream activity 302a is updated to have a larger duration value 322a than originally anticipated shown in schedule 320a, a reliability buffer 324a is generating having a grater duration value than the original reliability buffer 304a, while maintaining the SS time precedence relationship.

In the schedule 300b having initially planned lead, $-L_i$, no reliability buffer is initially applied. In the schedule 310b having initially planned lead, when the initially planned upstream activity 302b is updated to have a smaller duration value than originally anticipated, again no reliability buffer is applied. Also, when the initially planned upstream activity 302b is updated to have a larger duration value than originally anticipated, again no reliability buffer is applied.

In the schedule 300c having initially planned lag, $L_i$, when the initially planned upstream activity 302c is updated to have a smaller duration value 312c than originally anticipated as shown in schedule 310c, a reliability buffer 314c is generated (e.g. via the reliability buffer processor of FIG. 3) that has a shorter duration value than the original reliability buffer 304c, while maintaining the lag relationship 316c, $L_i$. Conversely, when the initially planned upstream activity 302c is updated to have a larger duration value 322c than originally anticipated as shown in schedule 320c, a reliability buffer 324c is generated that has a larger duration value than the original reliability buffer 304c, while maintaining the lag relationship 326c, $L_i$.

The activity time precedence relationship provided here is again between the reliability buffer 304a-304c, 314a, 314c, 324a, 324c and the respective upstream activity 302a-302c, 312a, 312c, 322a, 322c. For the purpose of time precedence relationships, as mentioned above, the reliability buffer 304a-304c, 314a, 314c, 324a, 324c can be considered in combination with the respective downstream activity 308a-308c, 318a, 318c, 328a, 328c to provide a buffered downstream activity.

Figure 7C:
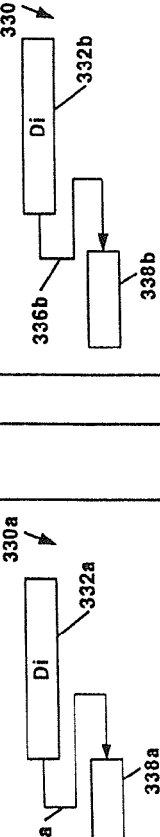
FIG. 7C is a table having listed therein a plurality of different project plan charts each having a different start to finish (SF) time precedence relationship and including a reliability buffer generated by the dynamic approach.

Referring now to FIG. 7C, a table illustrating time precedence relationships between upstream activities, downstream activities, and reliability buffers associated with the downstream activities is shown. Each of the rows 329a-329c show an SF time precedence relationship 336a-336c, 346c, 356c between an upstream activity 332a-332c, 342c, 352c and a downstream activity 338a-338c, 348c, 358c. It should be appreciated that reliability buffers 334c, 344c, 354c are taken as part of the downstream activities 338c, 348c, 358c. In row 329a, an initial (anticipated) schedule 330a-330c of an upstream activity 332a-332c is shown where an initially planned duration value, Di, for an upstream activity is equal to an updated duration value, $D_f$, associated with the upstream activity.

Rows 329b, 329c show two forms of updated project schedules. First in row 329b, a schedule 340a-340c is shown for which $D_i$ is greater than $D_f$, i.e., the upstream activity has been updated to finish earlier the initial schedule 330a-330c shown in row 330a. In row 329c, a schedule 350a-350c is shown for which $D_i$ is less than $D_f$, i.e., the upstream activity has been updated to finish later than anticipated in the initial schedules 330a-330c shown in row 329a. The SF relationship is shown without a lead or lag in schedules 330a, 340a, 350a, with a lead in schedules 330b, 340b, 350b, and with a lag in schedules 330c, 340c, 350c.

In the schedule 330a having no initially planned lead or lag, when the initially planned upstream activity 332a is updated to have a smaller duration value than originally anticipated as shown in schedule 340a, no reliability buffer is applied. Also, when the initially planned upstream activity 332a is updated to have a larger duration value than originally anticipated as shown in schedule 350a, again no reliability buffer is applied.

In the schedule 330b having initially planned lead, when the initially planned upstream activity 332b is updated to have a smaller duration value than originally anticipated as shown in schedule 340b, no reliability buffer is applied. Also, when the initially planned upstream activity 332b is updated to have a larger duration value than originally anticipated as shown in schedule 350b, again no reliability buffer is applied.

In the schedule 330c having initially planned lag, $-L_i$, when the initially planned upstream activity 332c is updated to have a smaller duration value 342c than originally anticipated as shown in schedule 340c, a reliability buffer 344c is generated (e.g. via the reliability buffer processor of FIG. 3) that has a shorter duration value than the original reliability buffer 334c, while maintaining the lag relationship 346c, –Li. Conversely, when the initially planned upstream activity 332c is updated to have a larger duration value 352c than originally anticipated as shown in schedule 350c, a reliability buffer 354c is generated that has a larger duration value, while maintaining the lag relationship 356c, $-L_i$.

The activity time precedence relationship provided here is between the downstream activity 338a-338c, 348c, 358c and the respective upstream activity 332a-332c, 342c, 352c. For the purpose of time precedence relationships, as mentioned above, the reliability buffer 334c, 344c, 354c can be considered in combination with the respective downstream activity 338c, 348c, 358c to provide a buffered downstream activity.

At each schedule update as indicated in FIGS. 7-7C, the remaining construction schedule is re-calculated. Reliability buffer duration values and time precedence relationships are re-calculated in a way that the remaining downstream work can benefit most from schedule advances in the upstream work, and schedule slips from upstream schedule disruptions are reduced. The sizes and locations of reliability buffers can be changed at each schedule update.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A reliability buffering method associated with a project planning model having project plan data and having a plurality of activities, wherein each one of the plurality of activities has one or more activity time precedence relationships, comprising:
   adding activity characteristics data to the project plan data;
   generating a reliability buffer duration value;
   adding the reliability buffer duration value to the project plan data; and
   placing a reliability buffer having a time duration determined in accordance with the reliability buffer duration value in front of and associated with a downstream activity.

2. The reliability buffering method of claim 1, further comprising:
   adding activity relationship data to the project plan data.

3. The reliability buffering method of claim 1, further comprising:
   altering the one or more activity time precedence relationships.

4. A reliability buffering method associated with a project planning model having project plan data, having a project schedule, and having a plurality of activities, comprising:
   selecting a downstream activity from among the plurality of activities;
   adding activity relationship data associated with the downstream activity and with at least one upstream activity to the project plan data;
   adding activity characteristics data associated with the downstream activity to the project plan data; and
   placing a reliability buffer in a buffer time precedence relationship with the downstream activity to provide a buffered downstream activity.

5. The reliability buffering method of claim 4, wherein adding activity relationship data comprises:
   adding a downstream sensitivity value to the project plan data.

6. The reliability buffering method of claim 4, wherein adding activity characteristics data comprises:
   adding an activity reliability value to the project plan data.

7. The reliability buffering method of claim 4, wherein adding activity characteristics data comprises:
   adding an activity production rate value to the project plan data.

8. The reliability buffering method of claim 4, wherein the buffer time precedence relationship is finish to start.

9. The reliability buffering method of claim 4, further comprising:
   generating a reliability buffer duration value associated with the reliability buffer;
   generating an activity time precedence relationship between the buffered downstream activity and the at least one upstream activity; and
   adding the reliability buffer duration value and the activity time precedence relationship to the project plan data to provide an initial reliability buffer project plan.

10. The reliability buffering method of claim 9, wherein the activity time precedence relationship is selected from the group consisting of finish to start, finish to finish, start to start, and start to finish.

11. The reliability buffering method of claim 9, wherein generating the reliability buffer duration value comprises:
   selecting one or more upstream activities associated with the downstream activity from among the plurality of activities; and
   generating a reliability buffer duration value that reduces a simulated schedule delay to the project schedule that occurs due to simulated schedule delays of respective ones of the one or more upstream activities, and that increases a simulated schedule advance to the project schedule that occurs due to simulated schedule advances of respective ones of the one or more upstream activities.

12. The reliability buffering method of claim 11, wherein generating the reliability buffer duration value comprises:
   selecting a plurality of reliability buffer duration values; and
   for each of the plurality of reliability buffer duration values,
      generating a simulated project schedule and a simulated project cost; and analyzing the simulated project schedules and the simulated project costs associated with the plurality of reliability buffer duration values; and selecting the reliability buffer duration value and the associated project schedule corresponding to a smallest simulated project schedule or associated with a smallest simulated project cost.

13. The reliability buffering method of claim 9, wherein generating the activity time precedence relationship comprises:

selecting a time precedence relationship from the group consisting of a finish to start relationship, a finish to finish relationship, a start to finish relationship, and a finish to start relationship;

selecting one or more upstream activities associated with the downstream activity from among the plurality of activities; and generating a reliability buffer lead or lag value that reduces a simulated schedule delay to the project schedule that occurs due to simulated schedule delays of respective ones of the one or more upstream activities, and that increases a simulated schedule advance to the project schedule that occurs due to simulated schedule advances of respective ones of the one or more upstream activities.

14. The reliability buffering method of claim 9, further comprising:

adding policy data to the project plan data.

15. The reliability buffering method of claim 14, wherein adding policy data comprises:

adding at least one of:
a manpower availability versus time value;
a overtime and flexible headcount control value,
a time buffer,
a thoroughness of quality control value;
a hiring time control value, or
a request for information (RFI) time duration value to the project plan data.

16. The reliability buffering method of claim 9, further comprising:

updating the project plan data to provide an updated reliability buffer project plan.

17. A project management system comprising:
a project data processor to provide project plan data; and
a reliability buffer processor adapted to receive the project plan data and to generate a project plan with reliability buffers, each one of the reliability buffers associated with a respective downstream activity.

18. The project management system of claim 17 further including a project plan processor adapted to provide conventional project plan data to the project data processor, and wherein the project data processor is adapted to receive the conventional project plan data and to provide the project plan data.

* * * * *

UNITED STATES PATENT AND TRADEMARK OFFICE
CERTIFICATE OF CORRECTION

PATENT NO. : 7,415,393 B1
APPLICATION NO. : 10/068087
DATED : August 19, 2008
INVENTOR(S) : Pena-Mora et al.

It is certified that error appears in the above-identified patent and that said Letters Patent is hereby corrected as shown below:

Col. 4, line 1, delete "of prior" and replace with -- of a prior --.

Col. 4, line 30, delete "relationships" and replace with -- relationship --.

Col. 4, line 66, delete "which a two" and replace with -- which two --.

Col. 5, line 27, delete "corresponds" and replace with -- correspond --.

Col. 5, line 30, delete "corresponds" and replace with -- correspond --.

Col. 5, line 34, delete "corresponds" and replace with -- correspond --.

Col. 8, line 57, delete ", an" and replace with -- , and --.

Col. 10, line 67, delete "a" and replace with -- at --.

Col. 11, line 16, delete "planned and the" and replace with -- planned and --.

Col. 12, line 2, delete "can not been" and replace with -- cannot be --.

Col. 13, line 17, delete "activity" and replace with -- activities --.

Col. 14, line 9, delete ", Li." and replace with -- , $L_i$. --.

Col. 15, line 60, delete "the" and replace with -- than the --.

Col. 16, line 11, delete "anticipated shown" and replace with -- anticipated as shown --.

Col. 16, line 13, delete "grater" and replace with -- greater --.

Col. 16, line 56, delete ", Di," and replace with -- , $D_i$, --.

Col. 16, line 63, delete "the" and replace with -- than the --.

UNITED STATES PATENT AND TRADEMARK OFFICE
CERTIFICATE OF CORRECTION

PATENT NO. : 7,415,393 B1
APPLICATION NO. : 10/068087
DATED : August 19, 2008
INVENTOR(S) : Pena-Mora et al.

It is certified that error appears in the above-identified patent and that said Letters Patent is hereby corrected as shown below:

Col. 17, line 24, delete ", Li." and replace with -- . $L_i$. --.

Signed and Sealed this

Eighteenth Day of August, 2009

David J. Kappos
*Director of the United States Patent and Trademark Office*